US010567205B2

(12) United States Patent
Park et al.

(10) Patent No.: US 10,567,205 B2
(45) Date of Patent: Feb. 18, 2020

(54) FREQUENCY AND TIME DOMAIN MULTIPLEXING FOR LOW PEAK-TO-AVERAGE POWER RATIO (PAPR) WAVEFORM DESIGN WITH MULTIPLE STREAMS

(71) Applicant: QUALCOMM Incorporated, San Diego, CA (US)

(72) Inventors: Seyong Park, San Diego, CA (US); Sony Akkarakaran, Poway, CA (US); Wei Zeng, San Diego, CA (US); Peter Gaal, San Diego, CA (US); Yi Huang, San Diego, CA (US); Renqiu Wang, San Diego, CA (US); Hao Xu, Beijing (CN); Tao Luo, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/674,428

(22) Filed: Aug. 10, 2017

(65) Prior Publication Data
US 2018/0212810 A1    Jul. 26, 2018

Related U.S. Application Data

(60) Provisional application No. 62/451,007, filed on Jan. 26, 2017.

(51) Int. Cl.
*H04L 27/26* (2006.01)
*H04L 5/00* (2006.01)
*H04J 11/00* (2006.01)

(52) U.S. Cl.
CPC ... *H04L 27/2621* (2013.01); *H04J 2011/0009* (2013.01); *H04J 2011/0013* (2013.01);
(Continued)

(58) Field of Classification Search
None
See application file for complete search history.

(56) References Cited

U.S. PATENT DOCUMENTS 8,160,188 B2 * 4/2012 Mudulodu .......... H04L 27/2647
375/347
8,284,864 B2  10/2012 Mege
(Continued)

FOREIGN PATENT DOCUMENTS

WO    WO2012051319 A1    4/2012

OTHER PUBLICATIONS

International Search Report and Written Opinion—PCT/US2018/012812—ISA/EPO—Apr. 18, 2018 (171873WO).
(Continued)

*Primary Examiner* — Donald L Mills
(74) *Attorney, Agent, or Firm* — Nerrie M. Zohn

(57) ABSTRACT

Methods, systems, and devices for wireless communications are described that support frequency and time domain multiplexing for low peak-to-average waveforms with multiple streams. A user equipment (UE) may identify sets of symbols associated with different streams (e.g., multiple single-carrier discrete Fourier transform (DFT)-spread waveforms), where each stream may be associated with a low peak-to-average power ratio (PAPR). In some cases, different waveforms may be mapped to subsets of frequency resources through frequency division multiplexing (FDM). The UE may further reduce the PAPR of the multiplexed waveforms by performing time division multiplexing (TDM) across the single-carrier streams, and sets of symbols that are not used by one waveform may be used by another waveform. Frequency domain phase ramps may be applied to align the multiplexed waveforms. Signals included in an uplink transmission according to these techniques may maintain properties similar to single-carrier waveforms, including a low PAPR.

32 Claims, 21 Drawing Sheets

(52) U.S. Cl.
CPC ............ *H04L 5/001* (2013.01); *H04L 5/0048* (2013.01); *H04L 27/262* (2013.01)

(56) References Cited

U.S. PATENT DOCUMENTS

| | | | |
|---|---|---|---|
| 8,526,514 | B2 | 9/2013 | Kim et al. |
| 8,532,047 | B2 | 9/2013 | Nguyen et al. |
| 8,699,609 | B2 | 4/2014 | Sorrentino |
| 9,379,858 | B2 | 6/2016 | Erceg et al. |
| 9,407,409 | B2 | 8/2016 | Bhattad et al. |
| 9,609,638 | B2 | 3/2017 | Nakashima et al. |
| 2002/0154715 | A1 | 10/2002 | Jin et al. |
| 2006/0227888 | A1 | 10/2006 | Khan |
| 2007/0274421 | A1 | 11/2007 | Jin et al. |
| 2009/0161749 | A1 | 6/2009 | Nangia et al. |
| 2010/0074130 | A1* | 3/2010 | Bertrand ............... H04L 1/0007 370/252 |
| 2010/0119018 | A1 | 5/2010 | Jin et al. |
| 2011/0070891 | A1 | 3/2011 | Nishio et al. |
| 2011/0149944 | A1 | 6/2011 | Ko et al. |
| 2012/0288041 | A1 | 11/2012 | Jin et al. |
| 2013/0107785 | A1* | 5/2013 | Bhattad ............... H04J 11/005 370/312 |
| 2015/0071153 | A1 | 3/2015 | Hong et al. |
| 2015/0092716 | A1 | 4/2015 | Han et al. |
| 2015/0365266 | A1 | 12/2015 | Zhang et al. |
| 2016/0087829 | A1 | 3/2016 | Jia et al. |
| 2017/0085308 | A1 | 3/2017 | Sun et al. |
| 2017/0288759 | A1* | 10/2017 | Namgoong .......... H04B 7/0456 |
| 2018/0205586 | A1* | 7/2018 | Park ................... H04L 27/2614 |
| 2018/0213510 | A1 | 7/2018 | Akkarakaran et al. |

OTHER PUBLICATIONS

Luo X., et al., "Transmit Diversity Scheme over Single SC-FDM Symbol for LTE-Advanced," Global Telecommunications Conference, 2009. GLOBECOM 2009. IEEE, Nov. 30-Dec. 4, 2009, 6 pages.

Nokia, et al., "Way Forward Waveform for Carrier Frequencies Beyond 40 GHz". 3GPP Draft; R1-1609599, Way Forward Waveform for Carrier Frequencies Beyond 40 GHZ, 3rd Generation Partnership Project (3GPP), Mobile Competence Centre; 650, Route Des Lucioles; F-06921 Sophia-Antipo, vol. RAN WG1, No. Lisbon, Portugal; Oct. 10, 2016-Oct. 15, 2016, Oct. 9, 2016 (Oct. 9, 2016), pp. 1-8, XP051149636, Retrieved from the Internet: URL: http://www.3gpp.org/ftp/Meetings_3GPP_SYNC/RAN1/Docs/.

Panasonic: "Mapping Position of Control Channel for Uplink SC-FDMA", Internet Citation, R1-051395, Nov. 11, 2005 (Nov. 11, 2005), pp. 1-6. XP002450961, Retrieved from the Internet: URL: http://www.3gpp.org/ftp/tsg_ran/WG1_RL1/TSGR1_43/Docs/R1-051395.zip.

Qualcomm Incorporated: "On UL Diversity Transmission Scheme," 3GPP Draft; R1-1708583 on UL Diversity Transmission Scheme, 3rd Generation Partnership Project (3GPP), Mobile Competence Centre; 650, Route Des Lucioles; F-06921 Sophia-Antipolis Cedex; France vol. RAN WG1, No. Hangzhou, CN; May 15, 2017-May 19, 2017, May 14, 2017 (May 14, 2017), XP051273776, 11 pages, Retrieved from the Internet: URL:http://www.3gpp.org/ftp/Meetings_3GPP_SYNC/RAN1/Docs/ [retrieved on May 14, 2017].

* cited by examiner

FREQUENCY AND TIME DOMAIN MULTIPLEXING FOR LOW PEAK-TO-AVERAGE POWER RATIO (PAPR) WAVEFORM DESIGN WITH MULTIPLE STREAMS

CROSS REFERENCES

The present application for patent claims priority to U.S. Provisional Patent Application No. 62/451,007 by Park et al., entitled "FREQUENCY AND TIME DOMAIN MULTIPLEXING FOR LOW PEAK-TO-AVERAGE POWER RATIO (PAPR) WAVEFORM DESIGN WITH MULTIPLE STREAMS," filed Jan. 26, 2017, assigned to the assignee hereof, and which is hereby expressly incorporated by reference herein in its entirety.

BACKGROUND

The following relates generally to wireless communication, and more specifically to frequency and time domain multiplexing for low peak-to-average power ratio (PAPR) waveform design with multiple streams.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system).

A wireless multiple-access communications system may include a number of base stations or access network nodes, each simultaneously supporting communications for multiple communications devices, which may be otherwise known as user equipment (UE). In some cases, a UE may identify multiple streams (i.e., waveforms including data or reference signals) to transmit to a base station, and the UE may multiplex these streams onto a set of resources for an uplink transmission. However, multiplexing multiple streams may increase the PAPR of the uplink transmission, which may be detrimental to communication in a wireless communications system, resulting in, for example, reduced throughput or reduced coverage.

SUMMARY

The described techniques relate to improved methods, systems, devices, or apparatuses that support frequency and time domain multiplexing for low peak-to-average waveforms with multiple streams. A user equipment (UE) may identify multiple sets of symbols associated with different streams (e.g., multiple single-carrier discrete Fourier transform (DFT)-spread waveforms), where each stream may be associated with a relatively low peak-to-average power ratio (PAPR). In some cases, different single-carrier waveforms may be mapped to subsets of frequency resources through frequency division multiplexing (FDM). However, the addition of single-carrier waveforms through FDM may result in uplink transmissions having a relatively larger PAPR (e.g., as compared to single-carrier waveforms). In some examples, the UE may reduce the PAPR of the multiplexed waveforms by performing time division multiplexing (TDM) within a symbol period across the single-carrier streams in addition to FDM, and sets of time intervals of the symbol period that are not used by a waveform for one stream may be used by a waveform for another stream. These techniques may help signals included in an uplink transmission to maintain properties similar to single-carrier waveforms and accordingly maintain a relatively lower PAPR.

A method for wireless communications is described. The method may include identifying a plurality of sets of symbols for a transmission in a symbol period, each of the plurality of sets of symbols associated with a different stream, mapping the plurality of sets of symbols to respective subsets of a plurality of time intervals, performing respective time to frequency domain transforms on the plurality of mapped sets of symbols over respective time to frequency domain transform sizes to obtain a plurality of frequency domain signals, applying respective frequency domain phase ramps to the plurality of frequency domain signals, mapping the plurality of phase ramped frequency domain signals to respective subsets of a set of subcarriers, generating a time domain waveform for the transmission based at least in part on a frequency to time domain transform of the mapped plurality of phase ramped frequency domain signals to the set of subcarriers, and transmitting the time domain waveform to a receiver.

An apparatus for wireless communications is described. The apparatus may include means for identifying a plurality of sets of symbols for a transmission in a symbol period, each of the plurality of sets of symbols associated with a different stream, means for mapping the plurality of sets of symbols to respective subsets of a plurality of time intervals, means for performing respective time to frequency domain transforms on the plurality of mapped sets of symbols over respective time to frequency domain transform sizes to obtain a plurality of frequency domain signals, means for applying respective frequency domain phase ramps to the plurality of frequency domain signals, means for mapping the plurality of phase ramped frequency domain signals to respective subsets of a set of subcarriers, means for generating a time domain waveform for the transmission based at least in part on a frequency to time domain transform of the mapped plurality of phase ramped frequency domain signals to the set of subcarriers, and means for transmitting the time domain waveform to a receiver.

Another apparatus for wireless communications is described. The apparatus may include a processor, memory in electronic communication with the processor, and instructions stored in the memory. The instructions may be operable to cause the processor to identify a plurality of sets of symbols for a transmission in a symbol period, each of the plurality of sets of symbols associated with a different stream, map the plurality of sets of symbols to respective subsets of a plurality of time intervals, perform respective time to frequency domain transforms on the plurality of mapped sets of symbols over respective time to frequency domain transform sizes to obtain a plurality of frequency domain signals, apply respective frequency domain phase ramps to the plurality of frequency domain signals, map the plurality of phase ramped frequency domain signals to respective subsets of a set of subcarriers, generate a time domain waveform for the transmission based at least in part on a frequency to time domain transform of the mapped plurality of phase ramped frequency domain signals to the set of subcarriers, and transmit the time domain waveform to a receiver.

A non-transitory computer-readable medium for wireless communications is described. The non-transitory computer-readable medium may include instructions operable to cause a processor to identify a plurality of sets of symbols for a transmission in a symbol period, each of the plurality of sets of symbols associated with a different stream, map the plurality of sets of symbols to respective subsets of a plurality of time intervals, perform respective time to frequency domain transforms on the plurality of mapped sets of symbols over respective time to frequency domain transform sizes to obtain a plurality of frequency domain signals, apply respective frequency domain phase ramps to the plurality of frequency domain signals, map the plurality of phase ramped frequency domain signals to respective subsets of a set of subcarriers, generate a time domain waveform for the transmission based at least in part on a frequency to time domain transform of the mapped plurality of phase ramped frequency domain signals to the set of subcarriers, and transmit the time domain waveform to a receiver.

Some examples of the method, apparatus, and non-transitory computer-readable medium described above may further include processes, features, means, or instructions for determining the respective subsets of the respective plurality of time intervals based at least in part on the respective time to frequency domain transform size. Some examples of the method, apparatus, and non-transitory computer-readable medium described above may further include processes, features, means, or instructions for determining the respective subsets of the respective plurality of time intervals based at least in part on frequency domain upsampling factors of the respective subsets of the set of subcarriers.

Some examples of the method, apparatus, and non-transitory computer-readable medium described above may further include processes, features, means, or instructions for determining the respective subsets of the respective plurality of time intervals based at least in part on a transform size of the frequency to time domain transform. Some examples of the method, apparatus, and non-transitory computer-readable medium described above may further include processes, features, means, or instructions for determining the respective subsets of the respective plurality of time intervals based at least in part on the respective frequency domain phase ramps.

In some examples of the method, apparatus, and non-transitory computer-readable medium described above, the plurality of sets of symbols may be orthogonal to each other within the time domain waveform. In some examples of the method, apparatus, and non-transitory computer-readable medium described above, the respective subsets of the respective plurality of time intervals may be orthogonal with respect to each other. In some examples of the method, apparatus, and non-transitory computer-readable medium described above, the respective subsets of the set of subcarriers may be orthogonal with respect to each other.

In some examples of the method, apparatus, and non-transitory computer-readable medium described above, at least two of the respective subsets of the set of subcarriers comprise interleaved subcarriers with respect to each other. In some examples of the method, apparatus, and non-transitory computer-readable medium described above, the respective time to frequency domain transform size of at least two of the respective time to frequency domain transforms may be a same transform size. In some examples of the method, apparatus, and non-transitory computer-readable medium described above, the respective time to frequency domain transform size of at least two of the respective time to frequency domain transforms may be different with respect to each other.

Some examples of the method, apparatus, and non-transitory computer-readable medium described above may further include processes, features, means, or instructions for frequency domain upsampling factors of at least two of the respective subsets of the set of subcarriers may be a same upsampling factor. Some examples of the method, apparatus, and non-transitory computer-readable medium described above may further include processes, features, means, or instructions for frequency domain upsampling factors of at least two of the respective subsets of the set of subcarriers may be different with respect to each other.

In some examples of the method, apparatus, and non-transitory computer-readable medium described above, a first set of symbols of the plurality of sets of symbols comprises a first type of information and a second set of symbols of the plurality of sets of symbols comprises a second, different type of information. In some examples of the method, apparatus, and non-transitory computer-readable medium described above, at least one of the plurality of sets of symbols may include reference signal sequences, data streams, or a combination thereof.

In some examples of the method, apparatus, and non-transitory computer-readable medium described above, the respective subset of the respective plurality of time intervals for the at least one of the plurality of sets of symbols comprises a first subset of the respective plurality of time intervals assigned to a first wireless device that may be different from a second subset of the respective plurality of time intervals assigned to a second wireless device for reference signal transmission.

Some examples of the method, apparatus, and non-transitory computer-readable medium described above may further include processes, features, means, or instructions for performing a frequency to time domain transform on a frequency domain sequence to obtain the reference signal sequences, the data streams, or a combination thereof. In some examples of the method, apparatus, and non-transitory computer-readable medium described above, the respective subsets of the set of subcarriers may be non-contiguous with respect to each other.

DETAILED DESCRIPTION

Figure 1:
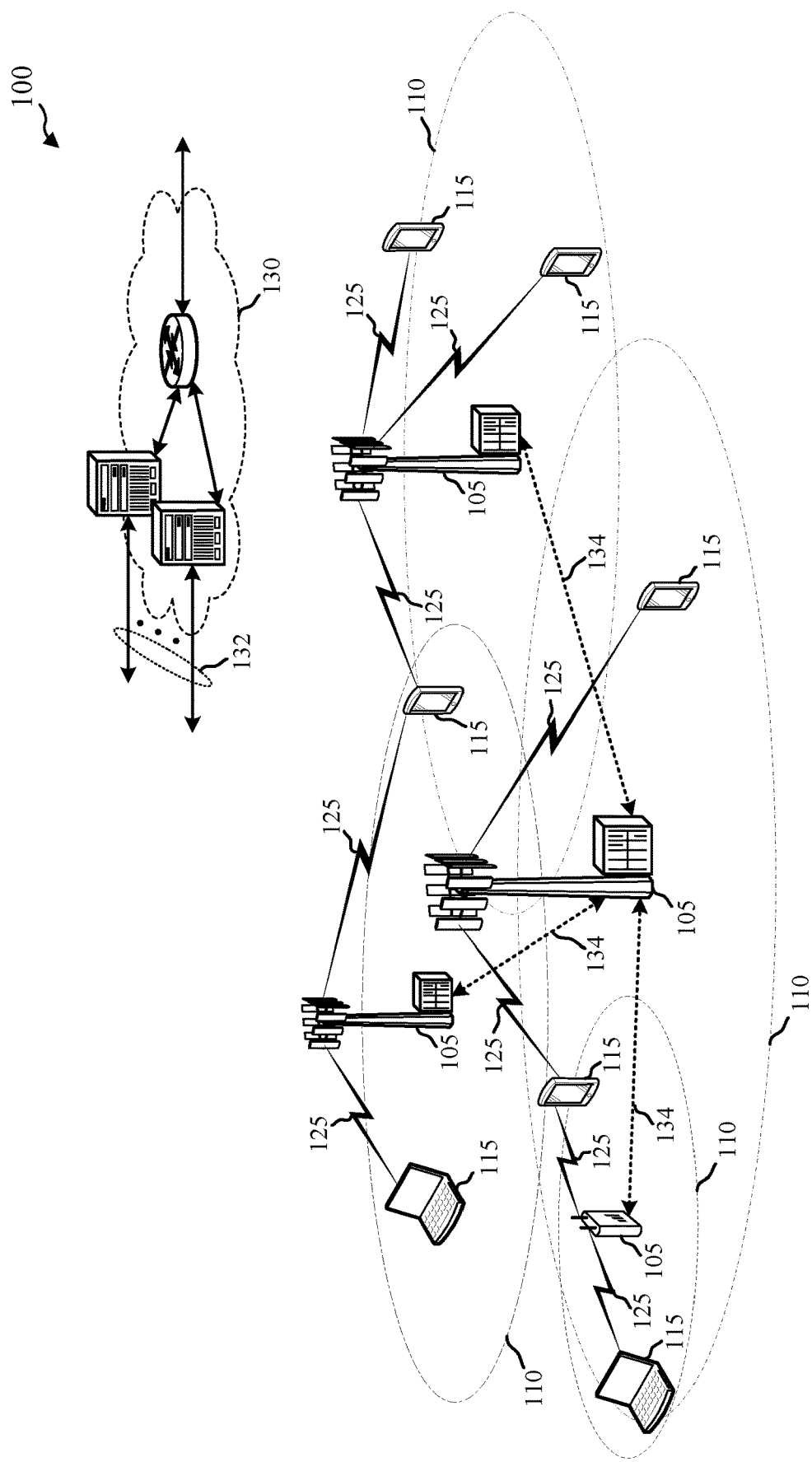
FIG. 1 illustrates an example of a wireless communications system that supports frequency and time domain multiplexing for low peak-to-average power ratio (PAPR) waveforms with multiple streams in accordance with aspects of the present disclosure.

A wireless communications system may support communication between a base station and a user equipment (UE). Specifically, the wireless communications system may support downlink transmissions from the base station to the UE and uplink transmissions from the UE to the base station. Uplink transmissions may include data, control signals, reference signals, etc., and different streams may be multiplexed over a set of frequency resources (i.e., frequency division multiplexing (FDM)) for an uplink transmission. For example, a UE may identify respective single-carrier streams of reference signals and data to be transmitted to a base station, and these streams may be multiplexed using FDM. In some cases, the peak-to-average power ratio (PAPR) of the uplink transmission including the multiplexed streams may be relatively high. In such cases, the UE may back off the power of its transmissions to compensate for the relatively higher PAPR. This may, however, result in a reduced throughput in a wireless communications system.

Some UEs may support efficient techniques for combined frequency and time domain multiplexing for reducing the PAPR of uplink transmissions to a base station. In some cases, the described techniques may increase efficiency or range of communications in a power-limited situation (i.e., a case in which power may be a limited resource, as opposed to bandwidth being the primary limitation for communications). For example, a UE may have a power amplifier with limitations that may result in a reduced area or range over which the UE is capable of transmitting for some types of signals. Without implementing the described techniques for PAPR reduction, a UE may be forced to back off transmission power to stay within operating ranges for the power amplifier and thus decrease the UE's transmission range, in an attempt to reduce distortion from the power amplifier caused by a high PAPR signal. These cases of limited transmission power may therefore limit throughput and impede performance in a system. In such cases, performance gains may be more dependent on an efficient use of power than on an efficient use of time-frequency resources. For example, the benefits gained though the described techniques for PAPR reduction may overcome any deficiencies incurred by lower resource utilization resulting from the same techniques. There may thus be an overall performance and throughput gain in the system by using such techniques.

To achieve reduced PAPR for uplink transmissions, a UE may identify multiple sets of symbols associated with different streams (i.e., respective streams) to be transmitted to a receiving device during a symbol period using a discrete Fourier transform (DFT)-spread orthogonal frequency division multiplexing (OFDM) (DFT-s-OFDM) waveform. In such cases, the UE may map the symbols to respective subsets of time intervals, where the respective subsets of time intervals may be determined based on DFT size(s), upsampling ratio(s), a size of an inverse DFT (IDFT), or phase ramp(s) to be applied in the frequency domain. The UE may then transform the mapped symbols using a DFT (e.g., via DFT spreading) resulting in respective frequency domain signals. Subsequently, the phase ramps may be applied to the respective frequency domain signals, which may, for example, introduce time delays to the signals when transformed to the time domain. The phase ramped signals may be mapped to multiple subcarriers, and the UE may then transform the mapped and phase ramped signals using an IDFT to obtain a time domain waveform that may be transmitted to the receiving device (e.g., a base station). Additionally, time domain mapping, DFT size(s), upsampling ratio(s), and phase ramps may be selected such that the symbols of different streams may occupy different (e.g., orthogonal) time resources within the transmitted time domain waveform. The described techniques may enable a UE to efficiently reduce PAPR of uplink transmissions despite potential inefficiencies that may result from a combination of frequency and time domain multiplexing. That is, the gain in performance from the efficient use of power by the UE may outweigh any potential loss of efficiency from a further division of resources in time.

Aspects of the disclosure above further described below with reference to a wireless communications system. These and other features are further illustrated by and described with reference to apparatus diagrams and system diagrams that relate to frequency and time domain multiplexing for low PAPR waveforms with multiple streams.

FIG. 1 illustrates an example of a wireless communications system 100 that supports frequency and time domain multiplexing for low PAPR waveforms with multiple streams in accordance with aspects of the present disclosure. The wireless communications system 100 includes base stations 105, UEs 115, and a core network 130. In some examples, the wireless communications system 100 may be a Long Term Evolution (LTE) (or LTE-Advanced (LTE-A)) network, or a New Radio (NR) network. In some cases, wireless communications system 100 may support enhanced broadband communications, ultra-reliable (i.e., mission critical) communications, low latency communications, and communications with low-cost and low-complexity devices. Wireless communications system 100 may enable a time domain and frequency domain mapping of multiple sets of symbols associated with different streams to achieve a transmitted waveforms with low PAPR.

Base stations 105 may wirelessly communicate with UEs 115 via one or more base station antennas. Each base station 105 may provide communication coverage for a respective geographic coverage area 110. Communication links 125 shown in the wireless communications system 100 may include uplink transmissions from a UE 115 to a base station 105, or downlink transmissions, from a base station 105 to a UE 115. Control information may be multiplexed on an uplink channel (e.g., physical uplink control channel (PUCCH)) or downlink channel (e.g., physical downlink control channel (PDCCH)) according to various techniques. Similarly, data may be multiplexed on an uplink channel (e.g., physical uplink shared channel (PUSCH)) or downlink channel (e.g., physical downlink shared channel (PDSCH)) according to various techniques. Control information and data may be multiplexed on a downlink channel, for example, using time division multiplexing (TDM) techniques, FDM techniques, or hybrid TDM-FDM techniques.

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communications device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

The core network 130 may provide user authentication, access authorization, tracking, Internet Protocol (IP) connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

In some cases, wireless communications system 100 may utilize enhanced component carriers (eCCs). An eCC may be characterized by one or more features including: wider bandwidth, shorter symbol duration, shorter transmission time interval (TTIs), and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration may be associated with increased subcarrier spacing. A transmission time interval (TTI) in an eCC may comprise of one or multiple symbols. In some cases, the TTI duration (that is, the number of symbols in a TTI) may be variable. In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may comprise of one or multiple symbols. In some cases, the TTI duration (that is, the number of symbols in a TTI) may be variable.

In some cases, a base station 105 or UE 115 may modulate a digital signal by modifying the properties of a periodic waveform (e.g., frequency, amplitude and phase) prior to transmitting to a receiving device. In a wireless communications system that uses narrow frequency subcarriers to transmit distinct symbols, the modulation is accomplished by varying the phase and amplitude of each symbol. For example, a binary phase shift keying (BPSK) modulation scheme conveys information by alternating between waveforms that are transmitted with no phase offset or with a 180° offset (i.e., each symbol conveys a single bit of information). In a quadrature amplitude modulation (QAM) scheme, two carrier signals (known as the in-phase component, I, and the quadrature component, Q) may be transmitted with a phase offset of 90°, and each signal may be transmitted with specific amplitude selected from a finite set. The number of amplitude bins determines the number of bits that are conveyed by each symbol. For example, in a 16 QAM scheme, each carrier signal may have one of four amplitudes (e.g., $-3, -1, 1, 3$), which results in 16 possible combinations (i.e., 4 bits). The various possible combinations may be represented in a graph known as a constellation map, where the amplitude of the I component is represented on the horizontal axis and the Q component is represented on the vertical axis. Wireless communications system 100 may use various modulation schemes when multiplexing multiple streams. For instance, sets of symbols associated with different streams may be modulated according to a BPSK scheme, a quadrature phase shift keying (QPSK) scheme, or various N-QAM schemes, and the streams may be multiplexed for transmission to a base station 105 using the TDM and FDM to achieve a low PAPR waveform. As used herein, QAM modulation refers to BPSK, QPSK, or various N-QAM schemes.

Elements of wireless communications system 100 (e.g., UE 115 and base station 105) may utilize digital signal processors (DSPs) implementing Fourier transforms. A DFT may transform discrete time data sets into a discrete frequency representation. The discrete frequency representation may be used to map information to subcarriers in the frequency domain. Further, an IDFT may be used to transform a discrete frequency representation (e.g., information represented in subcarriers) into a discrete time representation (e.g., a signal carrying information in the time domain). For example, a transmitter may perform a DFT to map information to subcarriers, and subsequently perform an IDFT to transform the information contained in subcarriers into a signal varying in time to convey the original information.

In some cases, a UE 115 may identify information to transmit to a base station 105 in an uplink transmission. Specifically, a UE 115 may identify multiple sets of streams (e.g., data signals associated with different data streams or data types, control signals, reference signals, etc.) to transmit to a base station 105 in a single symbol period. For example, a UE may be allocated a single symbol period for transmission, or otherwise benefit from conveying multiple types of information within a waveform for one symbol period. Prior to transmitting the signals, the UE may process the signals including, for example, modulation, mapping, and multiplexing the signals on a set of resources. For instance, different waveforms (e.g., different DFT-spread OFDM waveforms) associated with different streams may be multiplexed over a set of frequency resources (i.e., FDM) for an uplink transmission, where the different waveforms would, if sent independently, have a low PAPR property. However, multiplexing these waveforms through FDM may result in uplink transmissions having a larger PAPR (e.g., as compared to single-carrier waveforms).

According to aspects of the disclosure, the UE 115 may reduce the PAPR of the multiplexed waveforms by performing TDM within the symbol period in addition to FDM, and time intervals that are not used by one waveform may be used by another waveform. That is, the signals of the multiple sets of streams may be mapped, in the time domain, prior to performing a time-to-frequency domain transform (i.e., DFT), frequency domain phase ramping, tone mapping, and a frequency-to-time domain transform (i.e., IDFT). Accordingly, an uplink transmission that is generated through these techniques may maintain properties similar to single-carrier waveforms and maintain a low PAPR.

In wireless communications system 100, UEs 115 may support such techniques for reducing the PAPR of uplink transmissions to a base station 105. For example, a UE 115 may identify multiple sets of symbols associated with different streams to be transmitted to a receiving device during a symbol period using a DFT-s-OFDM waveform. In such cases, the UE 115 may map the symbols to respective subsets of time intervals. The UE 115 may then transform the mapped symbols using a DFT (e.g., via DFT spreading) resulting in respective frequency domain signals. Subsequently, phase ramps may be applied to the respective frequency domain signals, which may, for example, introduce time delays to the signals. The phase ramped signals may be mapped to multiple subcarriers, and the UE 115 may then transform the mapped and phase ramped signals using an IDFT to obtain a time domain waveform that may be transmitted to the receiving device (e.g., a base station). The respective subsets of time intervals, DFT sizes, upsampling ratios, and phase ramps used for each set of symbols may be selected such that the waveforms associated with each of the sets of symbols in the time domain waveform are orthogonal or pseudo-orthogonal. The techniques for uplink transmission described herein may be used for other transmissions such as UE-to-UE direct communication (e.g., sidelink communications, etc.), or other types of transmissions where a low PAPR may be desired. Additionally, a base station 105 may perform similar, but opposite or complementary, techniques to recover the sets of symbols.

Figure 2:
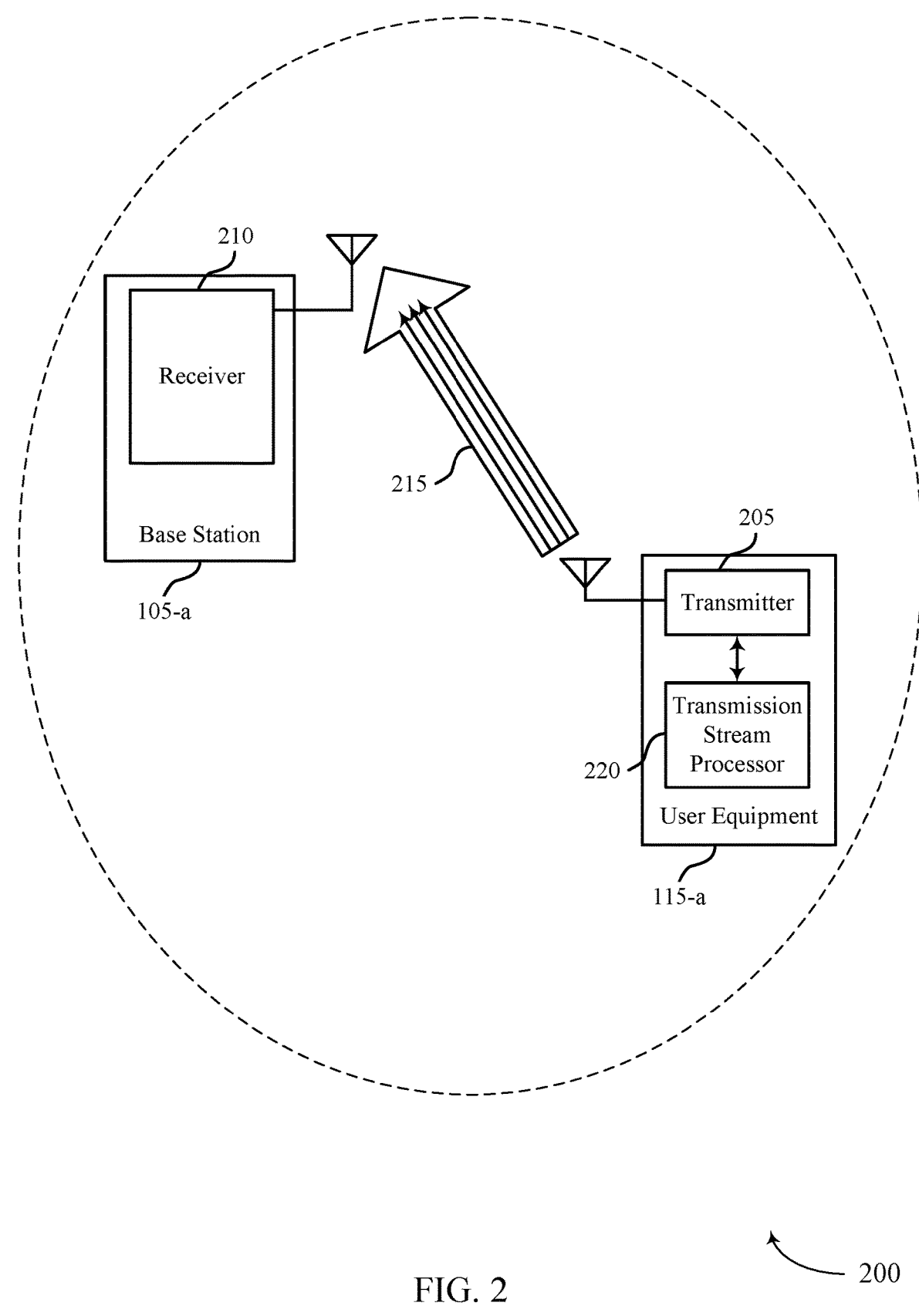
FIG. 2 illustrates an example of a wireless communications system that supports frequency and time domain multiplexing for low PAPR waveforms with multiple streams in accordance with aspects of the present disclosure.

FIG. 2 illustrates an example of a wireless communications system 200 that supports frequency and time domain multiplexing for low PAPR waveforms with multiple streams in accordance with aspects of the present disclosure. Wireless communications system 200 includes base station 105-a, which may be an example of a base station 105 as described with reference to FIG. 1. Wireless communications system 200 also includes UE 115-a, which may be an example of a UE 115 as described with reference to FIG. 1. UE 115-a may be configured with a transmitter 205 used to transmit signals prior to base station 105-a, and base station 105-a may be configured with a receiver 210 used to receive signals from UE 115-a. The transmitter 205 may communicate with a transmission stream processor 220 to process uplink signals prior to transmission.

In some cases, UE 115-a may identify information for an uplink transmission 215 to base station 105-a. For example, UE 115-a may identify respective single-carrier streams (e.g., reference signals and data) to be transmitted to base station 105-a, and these streams may be multiplexed using FDM. In such cases, the PAPR of the uplink transmission 215 including the multiplexed streams may be high, which may accordingly result in reduced throughput in a wireless communications system.

UE 115-a may support efficient techniques for reducing the PAPR of uplink transmission 215 to base station 105-a. For example, UE 115-a may identify multiple sets of symbols associated with different streams to be transmitted to base station 105-a during a symbol period using a DFT-s-OFDM waveform. In such cases, UE 115-a may map the symbols to respective subsets of time intervals, where the respective subsets of time intervals may be determined based on a DFT size, an upsampling ratio, a size of an IDFT, or a phase ramp. UE 115-a may then transform the mapped symbols using a DFT (e.g., via DFT spreading) resulting in respective frequency domain signals. Subsequently, phase ramps may be applied to the respective frequency domain signals, which may, for example, introduce time delays to the signals. The phase ramped signals may be mapped to multiple subcarriers, and UE 115-a may then transform the mapped and phase ramped signals using an IDFT to obtain a time domain waveform that may be transmitted to base station 105-a. Accordingly, UE 115-a may support techniques to map multiple different streams over time intervals such that the signals may be multiplexed over the frequency and time domain within a single DFT-s-OFDM symbol.

Figure 3:
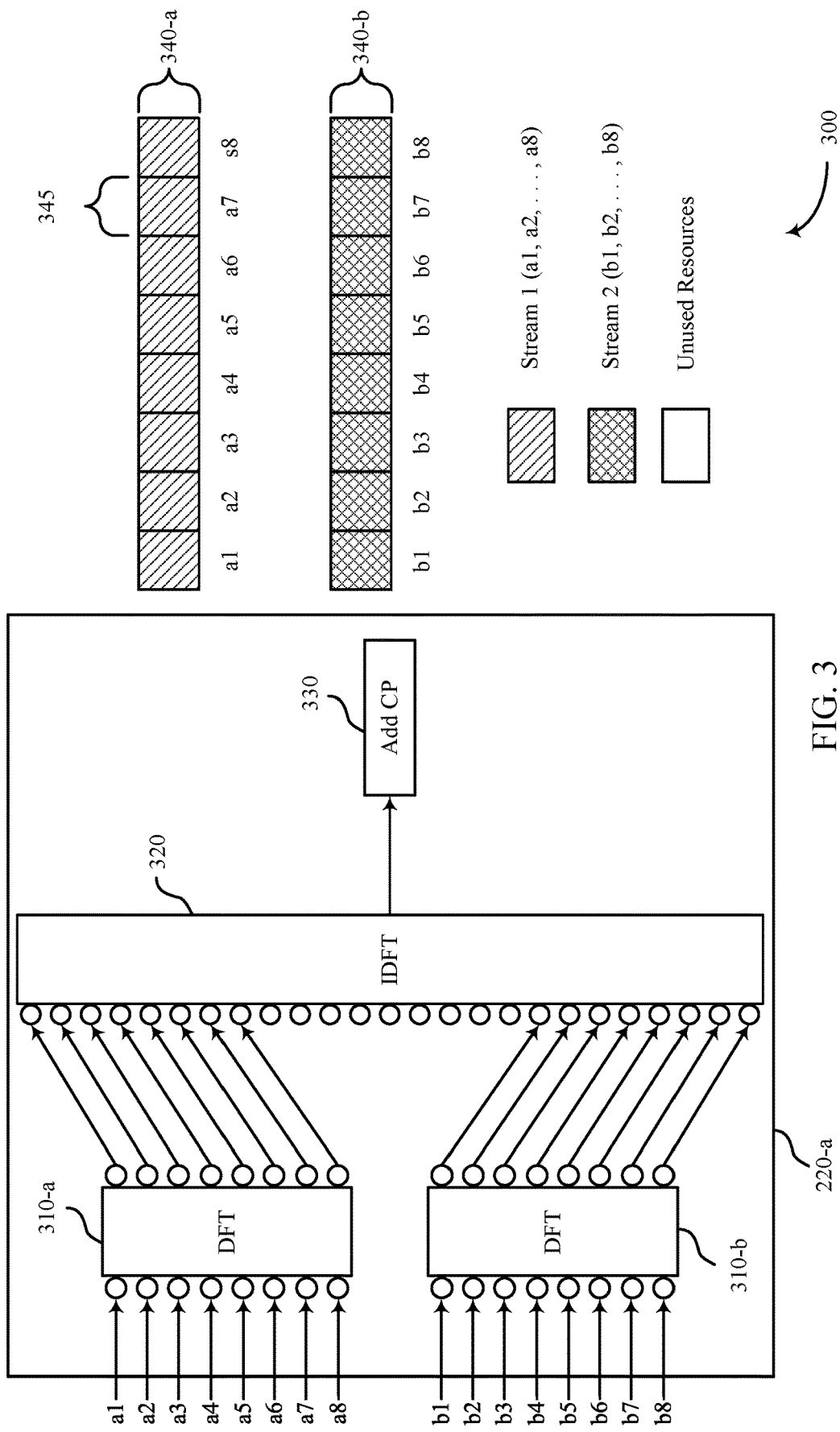
FIGS. 3 through 8 illustrate example diagrams of transmission stream processors that support frequency and time domain multiplexing for low PAPR waveforms with multiple streams in accordance with aspects of the present disclosure.

FIG. 3 illustrates an example diagram 300 of a transmission stream processor 220 that supports frequency and time domain multiplexing for low PAPR waveforms with multiple streams in accordance with aspects of the present disclosure. Transmission stream processor 220-a may provide for multiplexing multiple DFT-spread OFDM waveforms. In some examples, transmission stream processor 220-a may be an example of a transmission stream processor as described with reference to FIG. 2. Transmission stream processor 220-a may include one or more DFT components 310, an IDFT component 320, and a cyclic prefix adder 330. These components may be used to process signals received in a data stream into one or more IDFT outputs 340 for an uplink transmission from a transmitter to a receiver. For example, transmission stream processor 220-a may use FDM for multiple single-carrier streams using an upsampling ratio of 1.

A data stream received by a UE 115 (e.g., a stream with modulated symbols) may include a set of symbols. Sets of symbols may be mapped to particular time and frequency domain resources. For example, a first data stream may include eight symbols (identified as, e.g., a1 through a8), and a second data stream may include eight further symbols (identified as, e.g., b1 through b8). The mapping may further correspond to a defined upsampling ratio, which may provide for repetition of output data symbols 345 in the time domain. For example, FIG. 3 illustrates an upsampling ratio of 1, indicating that output data symbols 345 are not repeated. After identifying the sets of symbols in incoming data streams, the UE 115 may then transform the sets of symbols from the time domain to the frequency domain using a DFT (e.g., via DFT spreading). However, multiple data streams may be transformed by multiple DFTs, where the DFTs may be performed by different DFT components 310 of the transmission stream processor 220-a. Thus, multiple DFTs performed for different sets of data may result in different sets of waveforms. These different DFT spread waveforms may be transformed at IDFT component 320 from the frequency domain back to the time domain, and may be multiplexed to interleaved frequency resources. Finally, cyclic prefix adder 330 may append a cyclic prefix to the waveform to form IDFT outputs 340 corresponding to the originally received data streams.

However, adding multiple IDFT outputs 340 associated with different data streams may result in an increased PAPR. Because the resulting transmission includes adding together multiple single-carrier waveforms, the resulting waveform may not have similar properties to a single-carrier waveform. That is, the resulting waveform may have a greater PAPR than that of a pure single-carrier waveform, even though the PAPR of the individual signals, if transmitted independently, may be relatively low or acceptable. Accordingly, the uplink transmission from a transmitter (e.g., at a UE 115) may be distorted, and a receiver (e.g., at a base station) may not be able to correctly decode the transmission. In some examples, transmission stream processor 220-a may support efficient techniques for reducing the PAPR associated with an uplink transmission that includes uplink signals mapped to interleaved subsets of a set of frequency resources.

Figure 4:
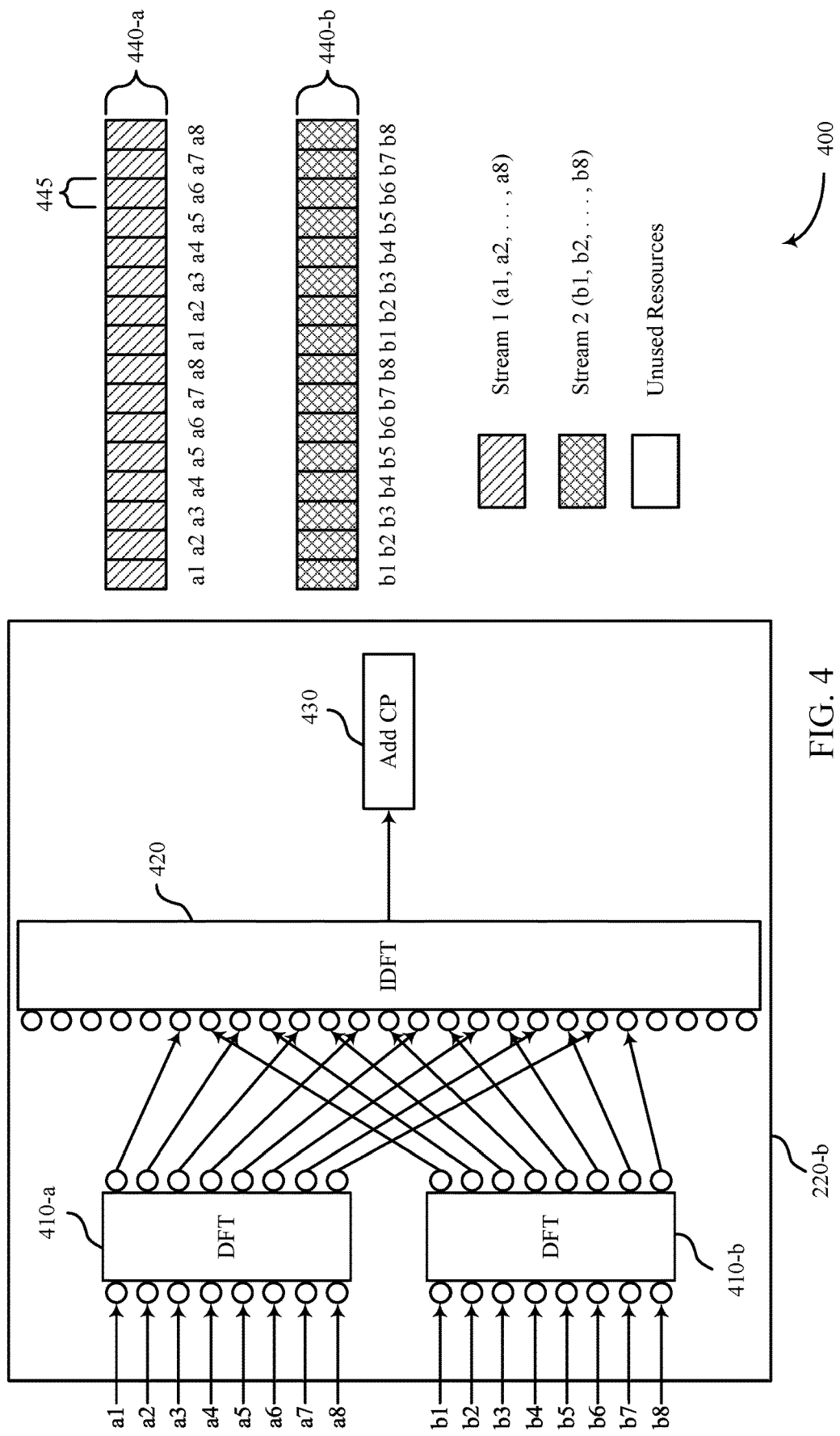

FIG. 4 illustrates an example diagram 400 of a transmission stream processor 220 that supports frequency and time domain multiplexing for low PAPR waveforms with multiple streams in accordance with aspects of the present disclosure. Transmission stream processor 220-b may provide for multiplexing multiple DFT-spread OFDM waveforms. In some examples, transmission stream processor 220-b may be an example of a transmission stream processor as described with reference to FIG. 2. Transmission stream processor 220-b may include one or more DFT components 410, an IDFT component 420, and a cyclic prefix adder 430. These components may be used to process signals received in a data stream into one or more IDFT outputs 440 for an uplink transmission from a transmitter to a receiver.

Transmission stream processor 220-b may process data streams similarly as described with reference to FIG. 3. However, FIG. 4 illustrates a mapping that corresponds to an upsampling ratio of 2, providing that, within an IDFT output 440, output data symbols 445 are repeated. This may be provided for by mapping tones to every other subcarrier. In this example, IDFT output 440-a may include a repetition of each of its output data symbol 445 (i.e., in the sequence a1, a2, . . . , a8, a1, a2, . . . , a8). Similarly, IDFT output 440-b may include a repetition of each of its output data symbol 445 (i.e., in the sequence b1, b2, . . . , b8, b1, b2, . . . , b8). As with FIG. 3, after identifying the sets of symbols in incoming data streams, the UE 115 may then transform the sets of symbols from the time domain to the frequency domain using a DFT (e.g., via DFT spreading). Multiple input data streams may be transformed by different DFT components 410, resulting in different sets of frequency domain signals, which may be multiplexed to interleaved frequency resources at IDFT component 420. These waveforms may be transformed at IDFT component 420 from the frequency domain back to the time domain. Finally, cyclic prefix adder 430 may append a cyclic prefix to the waveform to form one or more IDFT outputs 440 corresponding to the originally received data streams.

However, as described with reference to FIG. 3, adding multiple IDFT outputs 440 associated with different data streams may result in an increased PAPR. Because the resulting transmission includes adding together multiple single-carrier waveforms, the resulting waveform may not be a single-carrier waveform. Thus, the resulting waveform may have a greater PAPR than that of a pure single-carrier waveform, even though the PAPR of the individual signals, if transmitted independently, may be low or acceptable. Accordingly, the uplink transmission from a transmitter (e.g., at a UE 115) may be distorted, and a receiver (e.g., at a base station 105) may not be able to correctly decode the transmission. In some examples, transmission stream processor 220-b may support efficient techniques for reducing the PAPR associated with an uplink transmission that includes uplink signals mapped to interleaved subsets of a set of frequency resources.

Figure 5:
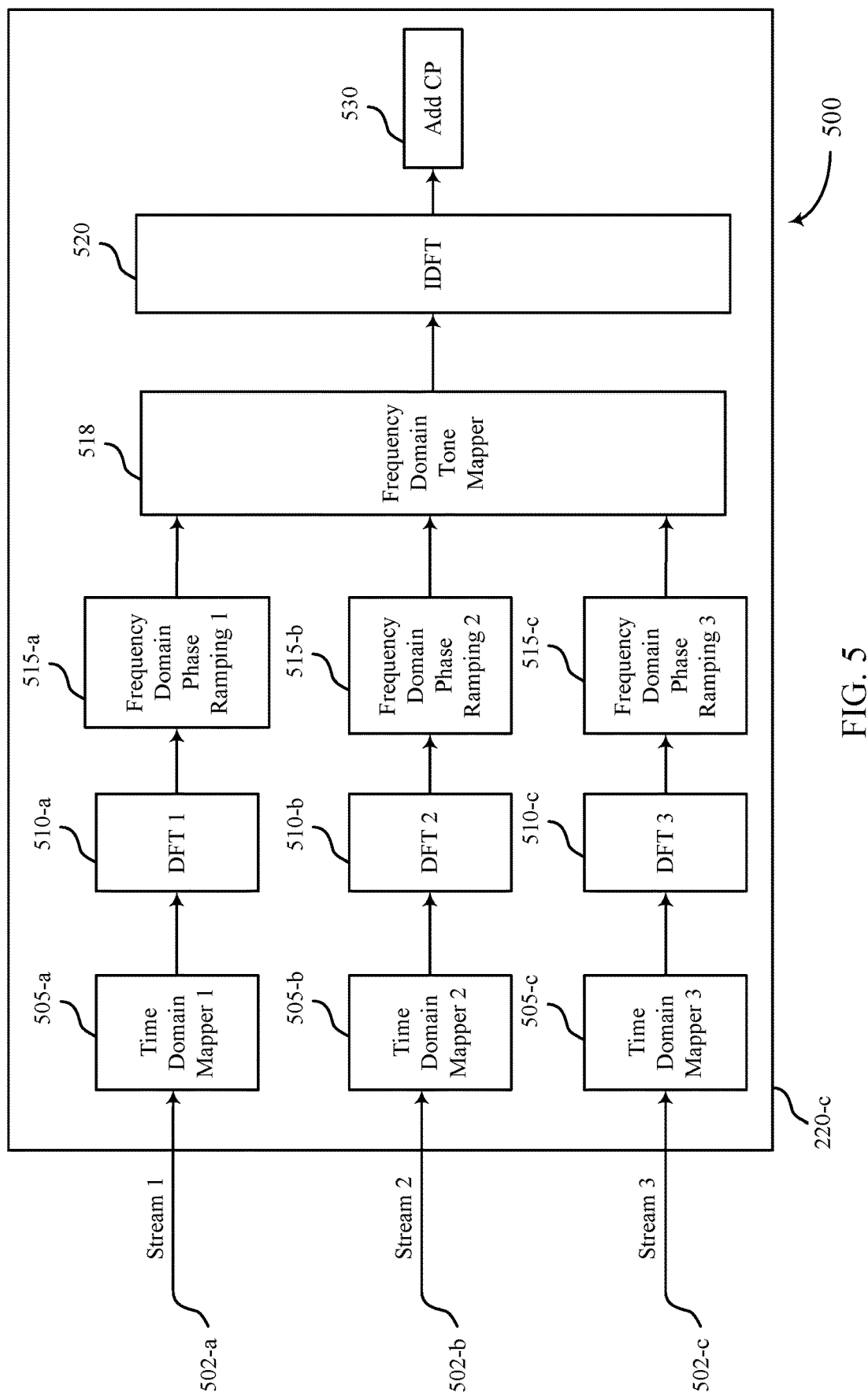

FIG. 5 illustrates an example diagram 500 of a transmission stream processor 220 that supports frequency and time domain multiplexing for low PAPR waveforms with multiple streams in accordance with aspects of the present disclosure. Transmission stream processor 220-b may provide for multiplexing multiple DFT-spread OFDM waveforms. In some examples, transmission stream processor 220-c may be an example of a transmission stream processor 220 as described with reference to FIG. 2. Transmission stream processor 220-c may receive and process one or more data streams 502 for an uplink transmission from a transmitter (e.g., at a UE 115) to a receiver (e.g., at a base station 105). Transmission stream processor 220-c may include one or more time domain mappers 505, one or more DFT components 510, one or more frequency domain phase rampers 515, a frequency domain tone mapper 518, an IDFT component 520, and a cyclic prefix adder 530.

As discussed with reference to FIGS. 1 through 4, multiplexing waveforms associated with different streams may increase the PAPR of an uplink transmission. This may be due to the uncontrolled superposition of multiple single-carrier waveforms in a single symbol period. Transmission stream processor 220-c may thus support efficient techniques to compensate for multiple waveforms corresponding to multiple input data streams that may be mapped to the same DFT-s-OFDM waveform within a symbol period. Specifically, transmission stream processor 220-a may include time domain mappers 505 that map data from received data streams 502 to corresponding time resources for input to DFT components 510. That is, time domain mappers 505 may map symbols from input data streams 502 to subsets of time intervals. In some examples, time domain mappers 505 may map the symbols to subsets of time intervals, that, when processed via DFT components 510, frequency domain phase rampers 515, frequency domain tone mapper 518, and IDFT component 520, result in time domain multiplexed (e.g., orthogonal) intervals within the time domain waveform output from IDFT component 520.

To begin, a UE 115 may identify data streams 502 associated with types of information for transmission in a DFT-s-OFDM waveform in a symbol period. The UE 115 may then identify sets of symbols within the data streams 502 to be processed by transmission stream processor 220-c for transmission during the symbol period. In the illustrated example, the UE 115 identifies three different streams. Each data stream 502 may include, for example, symbols for data, control information, reference signals (e.g., pilot signals), and the like.

Then, the symbols of each data stream 502 may be mapped in the time domain by a corresponding time domain mapper 505. Time domain mappers 505 may identify and assign a subset of a set of time domain intervals for each single carrier data stream 502. The corresponding subset of time domain intervals may be identified based on the size of DFT spreading blocks for each data stream 502, the upsampling ratio at frequency domain tone mapper 518, the size of the IDFT, and phase ramping at a corresponding frequency domain phase ramper 515 to account for shifting in the time domain. The assigned subsets of time domain intervals may be orthogonal (i.e., having no overlap) or pseudo-orthogonal (i.e., having a low degree of overlap). Thus, for example, for data stream 1 (502-a) in which $n_1$ is the DFT size and $o_1$ is the oversampling ratio, time domain mapper 505 may map a kth sample, where k=1, ..., $n_1$, to occupy a symbol interval (e.g., of an OFDM symbol), given by:

$$\left[\frac{N}{n_1 \times o_1}\left(k - \frac{3}{2}\right) + d_1, \frac{N}{n_1 \times o_1}\left(k - \frac{1}{2}\right) + d_1\right] \quad (1)$$

$$\left[\frac{N}{n_1 \times o_1}\left(k - \frac{3}{2}\right) + d_1 + \frac{N}{o_1}, \frac{N}{n_1 \times o_1}\left(k - \frac{1}{2}\right) + d_1 + \frac{N}{o_1}\right]$$

$$\left[\frac{N}{n_1 \times o_1}\left(k - \frac{3}{2}\right) + d_1 + \frac{2N}{o_1}, \frac{N}{n_1 \times o_1}\left(k - \frac{1}{2}\right) + d_1 + \frac{2N}{o_1}\right]$$

$$\left[\frac{N}{n_1 \times o_1}\left(k - \frac{3}{2}\right) + d_1 + \frac{3N}{o_1}, \frac{N}{n_1 \times o_1}\left(k - \frac{1}{2}\right) + d_1 + \frac{3N}{o_1}\right]$$

...

$$\left[\frac{N}{n_1 \times o_1}\left(k - \frac{3}{2}\right) + d_1 + \frac{N \times (o_1 - 1)}{o_1}, \right.$$

$$\left. \frac{N}{n_1 \times o_1}\left(k - \frac{1}{2}\right) + d_1 + \frac{N \times (o_1 - 1)}{o_1}\right],$$

where N represents the IDFT size and $d_1$ represents a delay. The intervals may be within a cyclic rotation of N (e.g., −1 may correspond to N−1, and 1 may correspond to N+1. After being mapped by the time domain mapper 505, a frequency domain phase ramp may be introduced to further shift occupied intervals in the time domain.

After mapping the sets of symbols to respective time intervals, DFT components 510 may perform a time to frequency domain transform (e.g., DFT spreading) on the mapped set of symbols over the set of time intervals to obtain one or more frequency domain signals, which may then be mapped to subcarriers and input to IDFT component 520. The mapping and IDFT accordingly generates a time domain waveform (e.g., an OFDM waveform) with the data streams 502 multiplexed in both the time domain and the frequency domain. However, generating the waveform may cause a shift in the time domain of, for example, half of one symbol. To account for this shift, a frequency domain phase ramper 515 may apply a frequency domain phase ramp to the corresponding frequency domain signal. By applying a phase ramp to each corresponding frequency domain signal of one or more data streams 502, transmission stream processor 220-c may align the waveforms in the time domain such that the PAPR of the final uplink transmission is reduced (the time domain signals of the streams are orthogonal or pseudo-orthogonal).

Frequency domain phase rampers 515 may determine a phase ramp for each corresponding waveform based on various equations to align the waveforms in the time domain to facilitate reducing the PAPR of an uplink transmission. For example, the phase ramp may be calculated based on the equation:

$$\text{Phase Ramp} = e^{-\frac{i\pi*(\text{frequency tone index})}{n_1*(\text{upsampling ratio})}} , \quad (2)$$

where $n_1$ represents the DFT size. Alternatively, the phase ramp may be calculated based on the equation:

$$\text{Phase Ramp} = c_1 e^{-\frac{i2\pi d_1 (\text{frequency tone index})}{N}}, \quad (3)$$

where $c_1$ represents a constant corresponding the data stream 502, $d_1$ represents a delay, and N represents the IDFT size. Frequency domain phase rampers 515 may thus compensate for an offset of a symbol (e.g., a QAM symbol) between multiple data streams 502 that may have different DFT sizes and upsampling ratios. That is, frequency domain phase rampers 515 may shift each stream in the time domain to ensure orthogonality across the multiple data streams 502.

Transmission stream processor 220-c may then, at frequency domain tone mapper 518, map the waveforms for each corresponding data stream 502 to a corresponding set of subcarriers (i.e., a corresponding set of tones). The set of subcarriers may be a subset of a larger set of subcarriers. Thus, frequency domain tone mapper 518 may accordingly map orthogonal or pseudo-orthogonal sets of subcarriers (i.e., sets of tones) to each of the data streams 502. Frequency domain tone mapper 518 may further support upsampling in the frequency domain. That is, frequency domain tone mapper 518 may map to different subcarriers that are multiples of a factor, which corresponds to upsampling in the time domain. Additionally or alternatively, one data stream 502 may be interleaved with another data stream 502. Multiple data streams 502 may thus be multiplexed with various combinations of upsampling and interleaving.

IDFT component 520 may then apply an IDFT (or inverse fast Fourier transform (IFFT)) to transform the discrete frequency representation (e.g., the information represented in the waveform carried by the subcarriers) into a waveform with a discrete time representation (e.g., a signal carrying information in the time domain).

Finally, cyclic prefix adder 530 may append a cyclic prefix to the time domain waveform to form an output waveform. The appended cyclic prefix may reduce intersymbol interference between DFT-s-OFDM symbols. The DFT-s-OFDM waveform may then be transmitted to a receiver via a transmitter, where the single-carrier properties of the DFT-s-OFDM waveform may reduce distortion or maximum power reduction (MPR) that may be needed to observe desired out-of-band emission properties.

Figure 6:
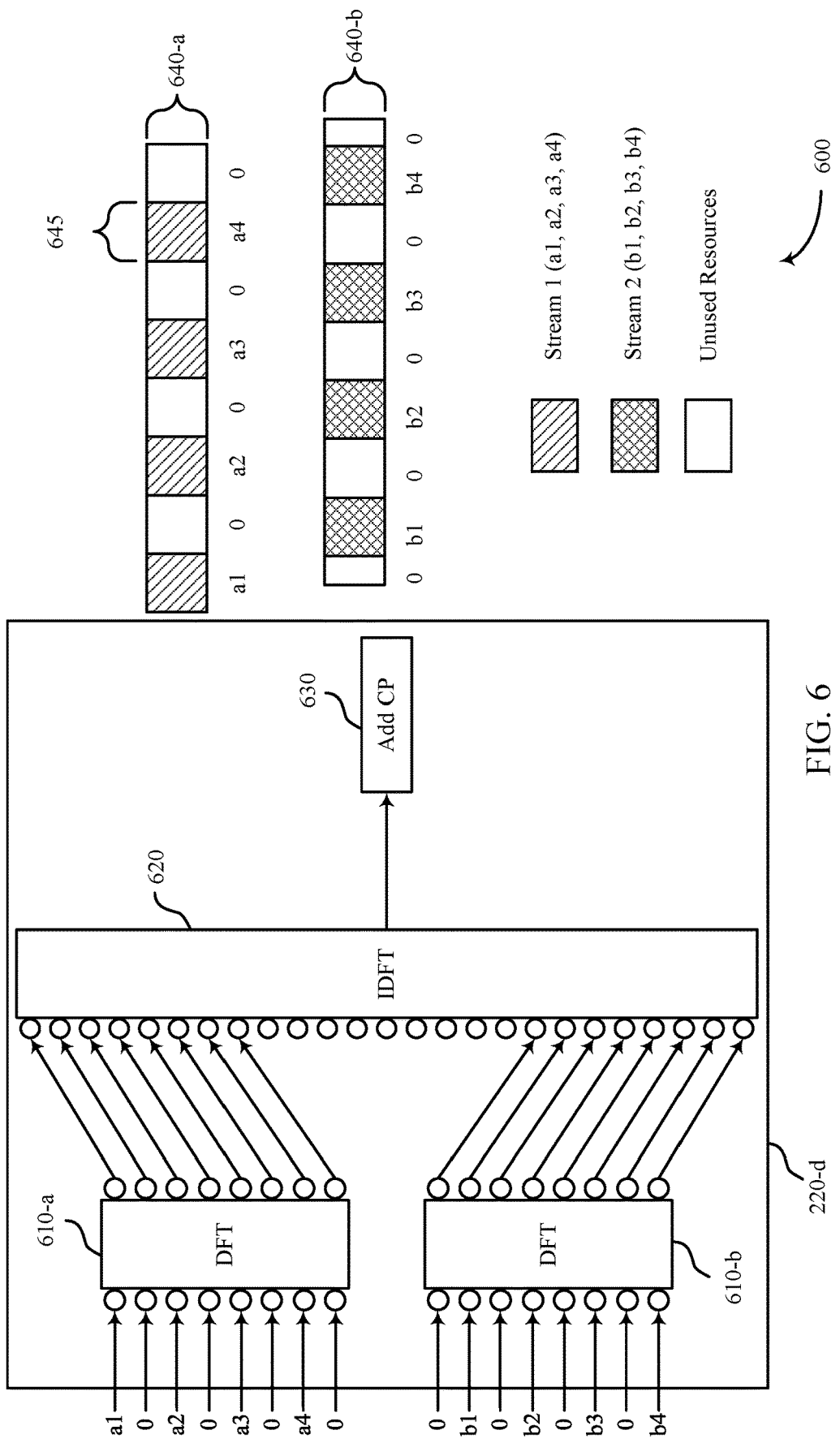

FIG. 6 illustrates an example diagram 600 of a transmission stream processor 220 that supports frequency and time domain multiplexing for low PAPR waveforms with multiple streams in accordance with aspects of the present disclosure. Transmission stream processor 220-d may provide for multiplexing multiple DFT-spread OFDM waveforms. In some examples, transmission stream processor 220-*d* may be an example of a transmission stream processor as described with reference to FIG. 2. Transmission stream processor 220-*d* may include one or more DFT components 610, an IDFT component 620, and a cyclic prefix adder 630. These components may be used to process signals received in a data stream into one or more IDFT outputs 640 for an uplink transmission from a transmitter (e.g., at a UE) to a receiver (e.g., at a base station).

As described with reference to FIG. 5, after identifying the sets of symbols in incoming streams, a UE 115 may then transform the sets of symbols from the time domain to the frequency domain using a DFT (e.g., via DFT spreading). However, multiple streams may be transformed by multiple DFTs, where the DFTs may be performed by different DFT components 610 of the UE 115. Thus, multiple DFTs performed for different sets of symbols associated with different streams may result in multiple frequency domain signals. These different DFT spread frequency domain signals may then be transformed at IDFT component 620 from the frequency domain back to the time domain, and result in multiplexed time resources of the time domain waveform output from the IDFT component 620. Finally, cyclic prefix adder 630 may append a cyclic prefix to the time domain waveform. The multiple streams may each be for data, control information, reference signals, etc.

Conceptually, the time domain waveform may include a first IDFT output 640-*a*, corresponding to the first received stream, that has a sequence for output time slots 645 that alternates between time slots that carry output samples of the stream and time slots that have no mapped information, resulting in a pattern of, for example: a1, 0, a2, 0, a3, 0, a4, 0 for the first stream. Similarly, a resulting second IDFT output 640-*b*, corresponding to the second received stream, may have a sequence for output time slots 645 that alternates between symbols that may carry information of the stream and time slots that do not carry information from the stream, resulting in a pattern of, for example: 0, b1, 0, b2, 0, b3, 0, b4. However, as described with reference to FIG. 5, generating the transformed waveforms may cause a shift in the time domain of, for example, half of one symbol. To account for this shift, a frequency domain phase ramper (not shown) may apply a frequency domain phase ramp to a corresponding waveform so that the resulting IDFT outputs 640 may align (that is, such that the time slots with information from the first stream line up with the time slots that do not have information from the second stream). Thus, after being multiplexed over the frequency domain and the time domain, the output time slots 645 carrying information in first IDFT output 640-*a* and in second IDFT output 640-*b* may not overlap. Therefore, the PAPR of a single-carrier waveform may be achieved in a DFT-s-OFDM waveform multiplexing multiple streams.

Figure 7:
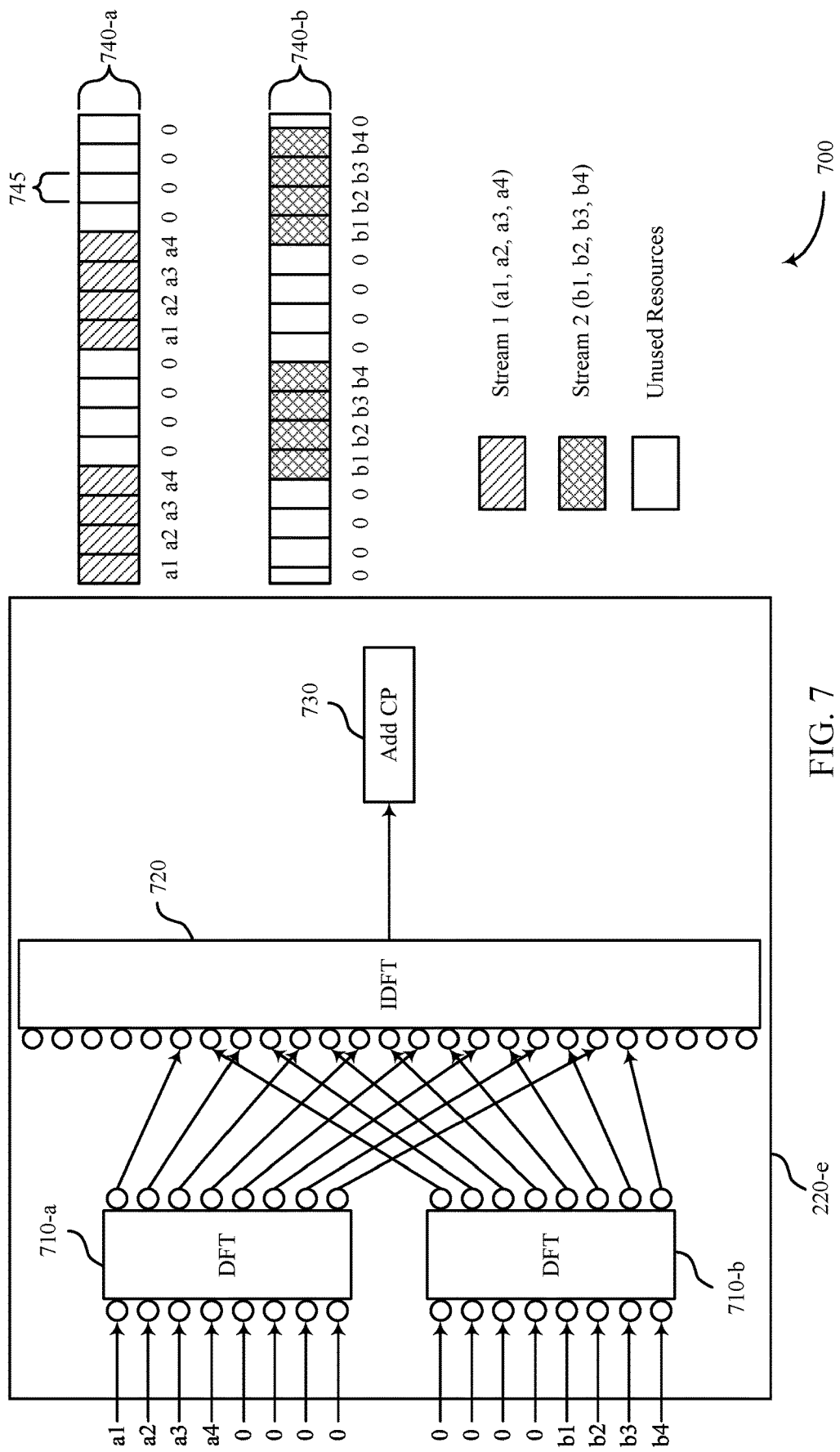

FIG. 7 illustrates an example diagram 700 of a transmission stream processor 220 that supports frequency and time domain multiplexing for low PAPR waveforms with multiple streams in accordance with aspects of the present disclosure. Transmission stream processor 220-*e* may provide for multiplexing multiple DFT-spread OFDM waveforms. In some examples, transmission stream processor 220-*e* may be an example of a transmission stream processor as described with reference to FIG. 2. Transmission stream processor 220-*e* may include one or more DFT components 710, an IDFT component 720, and a cyclic prefix adder 730. These components may be used to process signals received in a data stream into one or more IDFT outputs 740 for an uplink transmission from a transmitter (e.g., at a UE) to a receiver (e.g., at a base station).

Transmission stream processor 220-*e* may process streams similarly as described with reference to FIG. 6. However, here, example diagram 700 illustrates a mapping that corresponds to an upsampling ratio of 2, providing that, within an IDFT output 740, output data symbols 745 may be repeated. This may be provided for by mapping tones to every other subcarrier (e.g., doubling each mapped frequency tone). Thus, IDFT output 740-*a* corresponding to the portion of the DFT-s-OFDM waveform from a first stream may include a repetition of each of its output data symbols 745 (i.e., in the sequence a1, a2, a3, a4, . . . , a1, a2, a3, a4, . . . ). Similarly, IDFT output 740-*b* corresponding to the portion of the DFT-s-OFDM waveform from a second stream may include a repetition of each of its output data symbols 745 (i.e., in the sequence b1, b2, b3, b4, . . . , b1, b2, b3, b4, . . . ). As described with reference to FIG. 6, a data stream received by a UE 115 (e.g., a QAM stream) may include a set of symbols. Sets of symbols may be mapped to particular time and frequency domain resources. This mapping may not utilize all available subcarriers (i.e., all available tones). For example, a first stream may map information including, for example, four symbols (identified, e.g., as a1, a2, a3, and a4), to a first half of time intervals for input to a DFT component 710-*a*, and thus may leave the remaining time interval locations set to a base value, for example, the null symbol or zero. A second stream may map four symbols (identified, e.g., as b1, b2, b3, and b4) to the other time intervals for input to a DFT component 710-*b* and set the other time interval locations to the base value. The multiple streams may each be for data, control information, reference signals, etc.

As discussed with reference to FIGS. 5 and 6, after identifying the sets of symbols in incoming streams, a UE 115 may then transform the sets of symbols from the time domain to the frequency domain using a DFT (e.g., via DFT spreading). However, multiple streams may be transformed by multiple DFTs, where the DFTs may be performed by different DFT components 710 of the UE 115. Thus, multiple DFTs performed for different sets of data may result in different sets of frequency domain signals. These different frequency domain signals may then be mapped to subsets of a set of subcarriers transformed using IDFT component 720 from the frequency domain back to the time domain. Finally, cyclic prefix adder 730 may append a cyclic prefix to the time domain waveform to form IDFT output 740.

IDFT output 740 may be conceptually divided into a first IDFT output 740-*a*, corresponding to the first stream and a second IDFT output 740-*b* corresponding to the second stream. Because of the mapping of the symbols of the first stream to the first four time intervals of the DFT and subsequent upsampling by a factor of 2 in mapping to subcarriers for the IDFT, the first IDFT output 740-*a* results in a pattern of a1, a2, a3, a4, 0, 0, 0, 0, a1, a2, a3, a4, 0, 0, 0, 0 in the output time slots. Similarly, because of the mapping of the symbols of the second stream to the last four time intervals of the DFT and subsequent upsampling by a factor of 2 in mapping to subcarriers for the IDFT, the second IDFT output 740-*b* results in a pattern of 0, 0, 0, 0, b1, b2, b3, b4, 0, 0, 0, 0, b1, b2, b3, b4 in the output time slots. However, as described with reference to FIG. 5, generating the transformed waveforms may cause a shift in the time domain of, for example, half of one symbol. To account for this shift, a frequency domain phase ramper (not shown) may apply a frequency domain phase ramp to a corresponding waveform so that the resulting IDFT outputs 740 may align (e.g., time slots carrying information for the first stream line up with time slots without information from the second stream and vice versa). Thus, the frequency domain and time domain multiplexing of multiple streams in a single DFT-s-OFDM waveform for transmission in single symbol period results in non-overlapping (e.g., orthogonal) sets of time slots occupied by the two streams in the symbol period. Accordingly, the PAPR of a single-carrier waveform may be achieved in a DFT-s-OFDM waveform multiplexing multiple streams.

Figure 8:
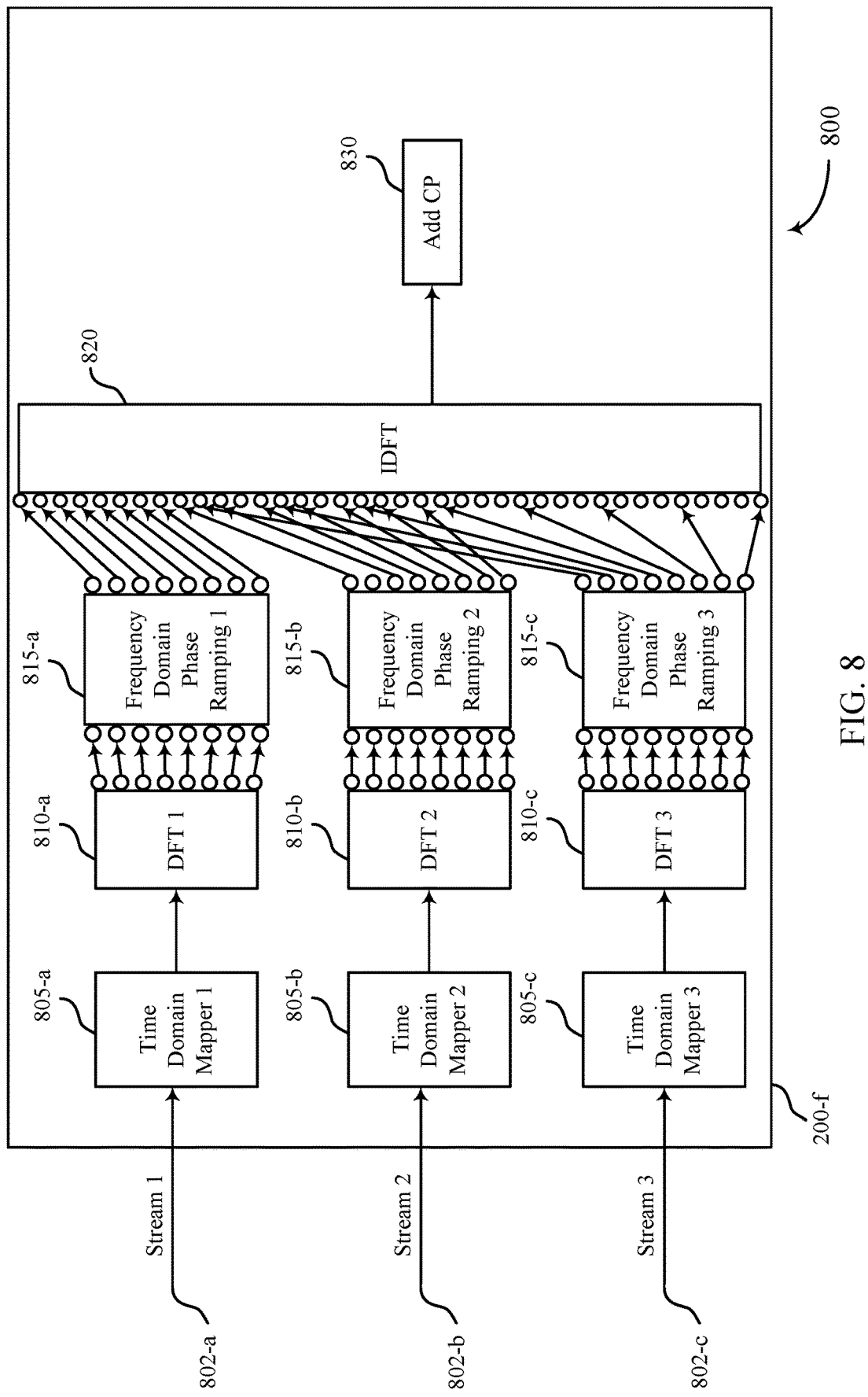

FIG. 8 illustrates an example diagram 800 of a transmission stream processor 220 that supports frequency and time domain multiplexing for low PAPR waveforms with multiple streams in accordance with aspects of the present disclosure. Transmission stream processor 220-f may provide for multiplexing multiple DFT-spread OFDM waveforms. In some examples, transmission stream processor 220-f may be an example of a transmission stream processor 220 as described with reference to FIG. 2. Transmission stream processor 220-f may receive and process one or more data streams 802 for an uplink transmission from a transmitter (e.g., at a UE 115) to a receiver (e.g., at a base station 105). Transmission stream processor 220-f may include one or more time domain mappers 805, one or more DFTs components 810, one or more frequency domain phase rampers 815, an IDFT component 820, and a cyclic prefix adder 830.

Transmission stream processor 220-f may process data streams 802 as described with reference to FIG. 5. In particular, transmission stream processor 220-f provides an example of processing multiple data streams 802 using differing upsampling ratios. For example, a first data stream 802-a may be processed according to an upsampling ratio of 1, a second data stream 802-b may be processed according to an upsampling ratio of 2, and a third data stream 802-c may be processed according to an upsampling ratio of 3. In the example of diagram 800, each data stream 802 may be assumed to have a constant DFT size equal to 8. To line up (e.g., orthogonally) the output associated with each data stream 802 in the DFT-s-OFDM symbol period, frequency domain phase rampers 815 may individually calculate a frequency domain phase ramp for each data stream 802, for example, according to equation (2) or (3) above. Each data stream 802 may thus be multiplexed in the time domain and frequency domain within a single DFT-s-OFDM waveform while maintaining single-carrier properties including a low PAPR.

Figure 9:
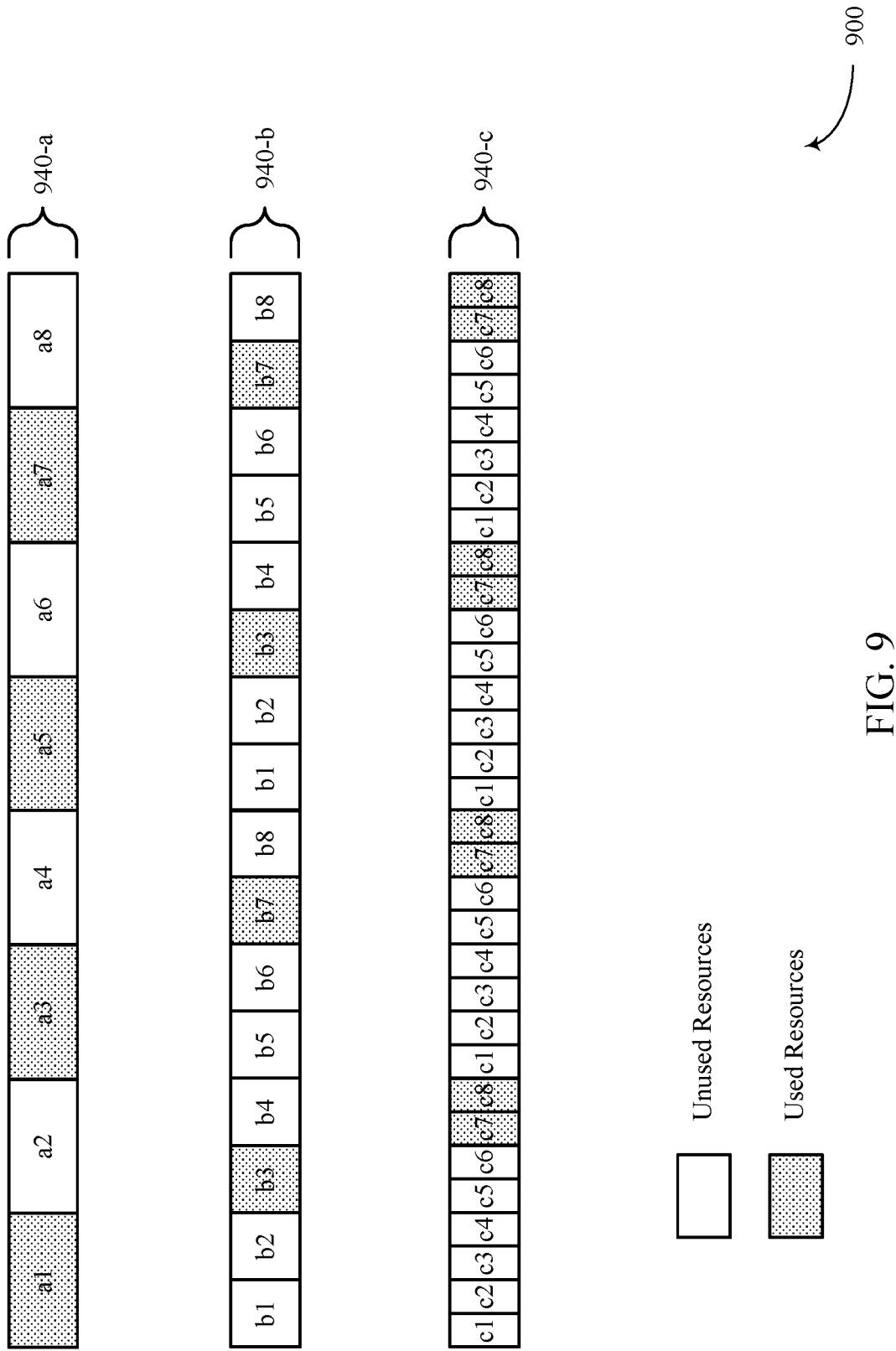
FIG. 9 illustrates an example of time domain signals in a system that supports frequency and time domain multiplexing for low PAPR waveforms with multiple streams in accordance with aspects of the present disclosure.

FIG. 9 illustrates an example of time domain signals 900 in a system that supports frequency and time domain multiplexing for low PAPR waveforms with multiple streams in accordance with aspects of the present disclosure. In some examples, time domain signals 900 may illustrate examples of the resulting streams as described with reference to FIG. 8.

In the example of FIG. 9, the first stream is mapped in the time domain to time intervals a1, a3, a5, and a7, the second stream is mapped in the time domain to time intervals b3 and b7, and the third stream is mapped in the time domain to time intervals c7 and c8, with null symbols or zeros input to the DFT components for the remaining time intervals. After the DFT, subcarrier mapping (including upsampling), and IDFT are performed, the resulting time slots for each stream are shown.

Again, the output of the IDFT can conceptually be described as individual IDFT outputs 940 that make up the DFT-s-OFDM waveform. An IDFT output 940-a illustrates the resulting time slots corresponding to the first stream as described with reference to FIG. 8 (e.g., having an upsampling ratio of 1). IDFT output 940-b illustrates the resulting time slots corresponding to the second stream as described with reference to FIG. 8 (e.g., having an upsampling ratio of 2). IDFT output 940-c illustrates the resulting time slots corresponding to the third data stream as described with reference to FIG. 8 (e.g., having an upsampling ratio of 4). As shown in FIG. 9, the lengths in the time domain of data slots for each of the three IDFT outputs 940 are different. As described with reference to FIG. 5, generating the waveforms may cause a shift in the time domain of, for example, half of one symbol. To account for this shift, a frequency domain phase ramper may apply a frequency domain phase ramp to a corresponding waveform so that the resulting IDFT outputs 940 may align. Here, less frequency domain phase ramping may be used for streams having higher upsampling factors. Thus, after being mapped to different subsets over the frequency domain and the time domain, the information carried in each of the IDFT outputs 940 may not overlap. The three IDFT outputs 940 are thus multiplexed over the frequency domain as well as the time domain, while maintaining a PAPR equivalent to that of a single-carrier data stream. As shown through the shaded elements, indicating used resources, the effect of an increased upsampling ratio is repetition of the transmitted pattern as shown by the output time slots of IDFT outputs 940.

Figure 10:
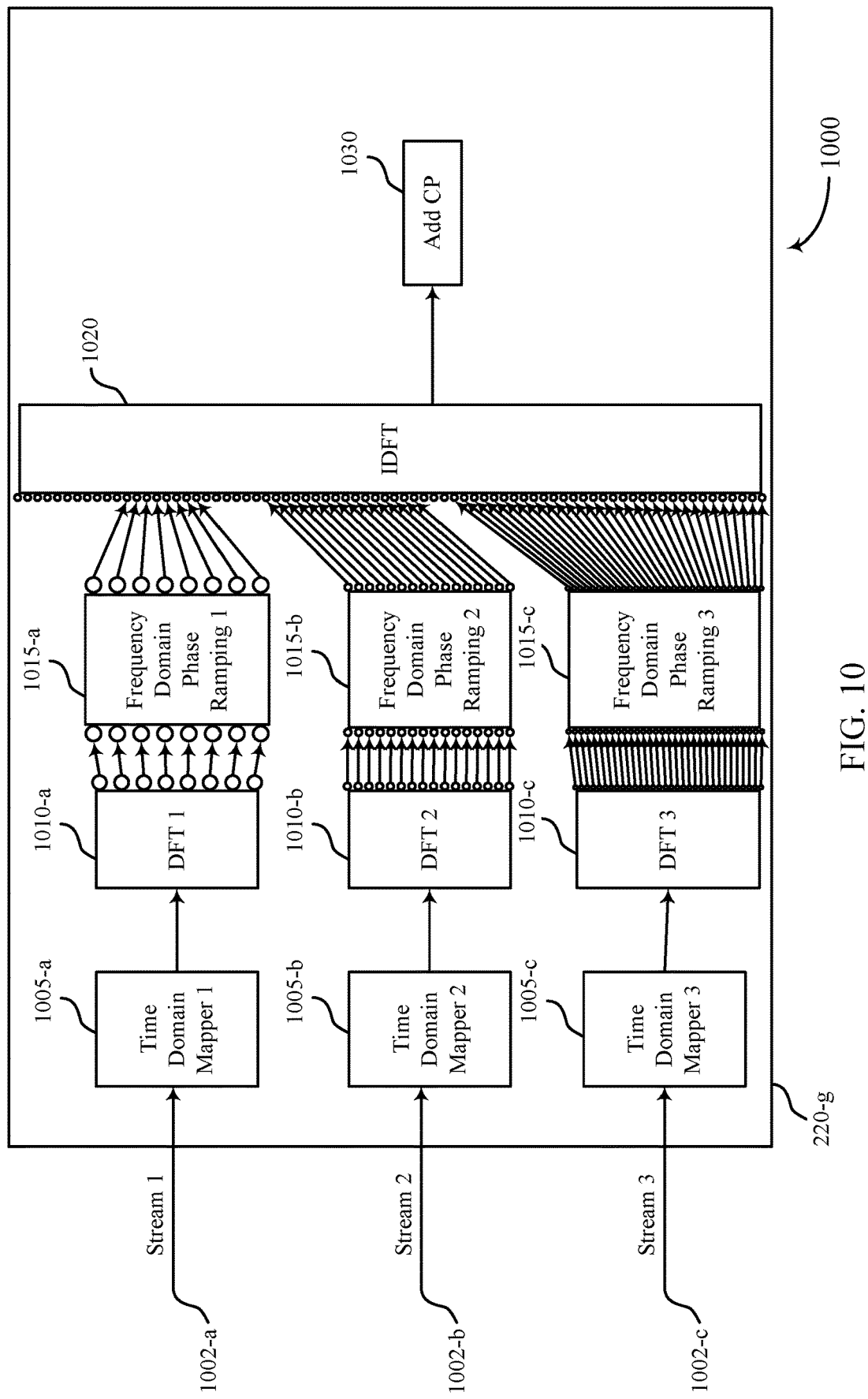
FIG. 10 illustrates an example diagram of a transmission stream processor at a UE that supports frequency and time domain multiplexing for low PAPR waveforms with multiple streams in accordance with aspects of the present disclosure.

FIG. 10 illustrates an example diagram 1000 of a transmission stream processor 220 that supports frequency and time domain multiplexing for low PAPR waveforms with multiple streams in accordance with aspects of the present disclosure. Transmission stream processor 220-g may provide for multiplexing multiple DFT-spread OFDM waveforms. In some examples, transmission stream processor 220-g may be an example of a transmission stream processor 220 as described with reference to FIG. 2. Transmission stream processor 220-g may receive and process one or more data streams 1002 for an uplink transmission from a transmitter (e.g., at a UE 115) to a receiver (e.g., at a base station 105). Transmission stream processor 220-g may include one or more time domain mappers 1005, one or more DFTs components 1010, one or more frequency domain phase rampers 1015, an IDFT component 1020, and a cyclic prefix adder 1030.

Transmission stream processor 220-g may process data streams 1002 as described with reference to FIG. 5. In particular, transmission stream processor 220-f provides an example of processing multiple data streams 1002 using differing DFT sizes. For example, a first data stream 1002-a may be processed using a DFT size of 8, a second data stream 1002-b may be processed using a DFT size of 16, and a third data stream 1002-c may be processed using a DFT size of 32. In the example of diagram 1000, each data stream 1002 may be assumed to be processed according to a constant upsampling ratio of 1. To line up the time slots of each data stream 1002, frequency domain phase rampers 1015 may individually calculate a frequency domain phase ramp corresponding to each data stream 1002, for example, according to equations (2) and (3) above.

Figure 11:
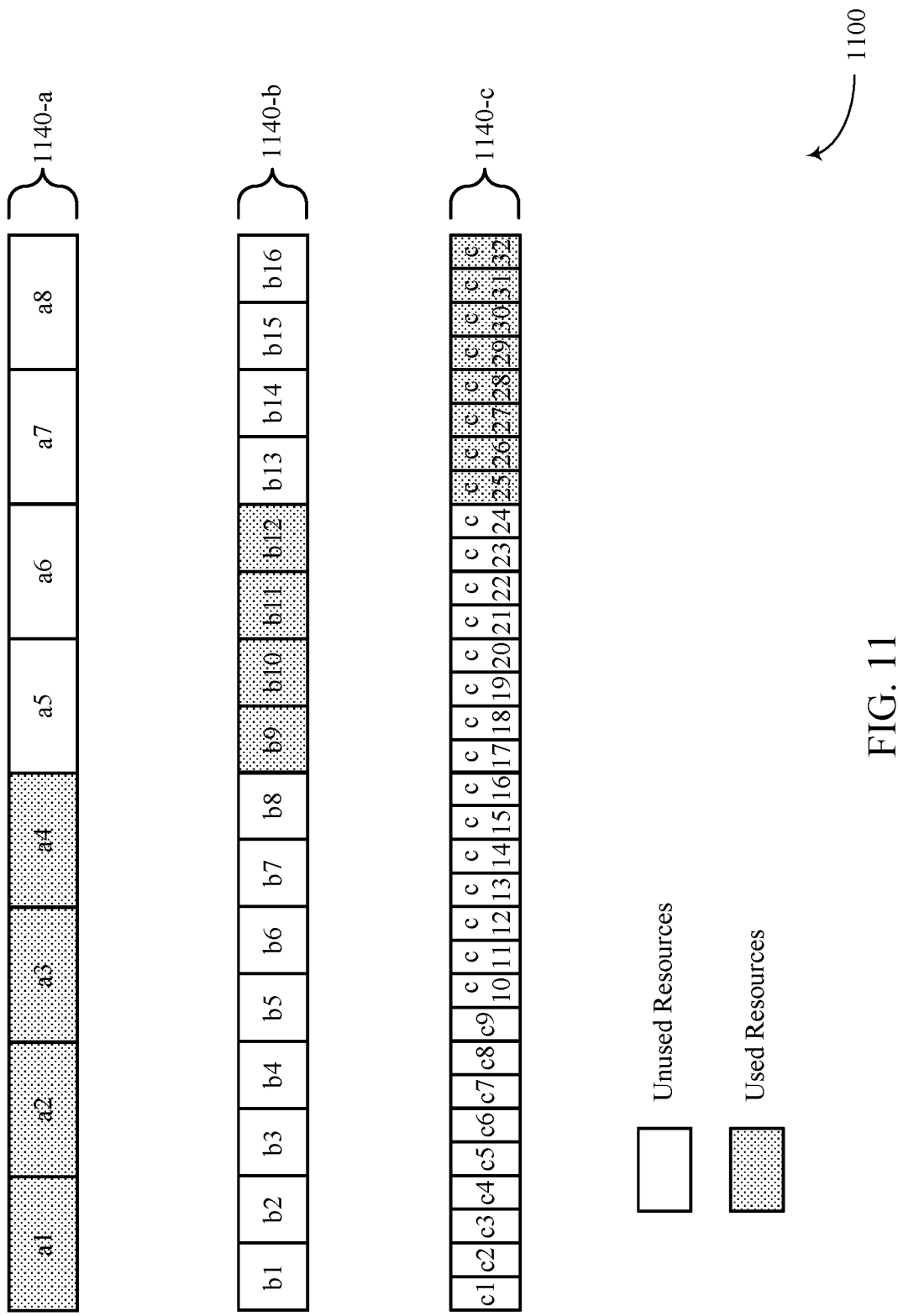
FIG. 11 illustrates an example of time domain signals in a system that supports frequency and time domain multiplexing for low PAPR waveforms with multiple streams in accordance with aspects of the present disclosure.

FIG. 11 illustrates an example of time domain signals 1100 in a system that supports frequency and time domain multiplexing for low PAPR waveforms with multiple streams in accordance with aspects of the present disclosure. In some examples, time domain signals 1100 may illustrate examples of the resulting streams as described with reference to FIG. 10.

In the example of FIG. 11, the first stream is mapped in the time domain to time intervals a1, a2, a3, and a4, the second stream is mapped in the time domain to time intervals b9, b10, b11 and b12, and the third stream is mapped in the time domain to time intervals c25, c26, c27, c28, c29, c30, c31 and c32, with null symbols or zeros input to the DFT components for the remaining time intervals. After the DFT, subcarrier mapping (including upsampling), and IDFT are performed, the resulting time slots for each stream are shown.

IDFT output 1140-a illustrates the resulting time slots corresponding to the first stream as described with reference to FIG. 10, the first stream being processed using a DFT size of 8. IDFT output 1140-b illustrates the resulting time slots corresponding to the second stream as described with reference to FIG. 10, the second stream being processed using a DFT size of 16. IDFT output 1140-c illustrates the resulting time slots corresponding to the third stream as described with reference to FIG. 10, the third stream being processed using a DFT size of 32. As shown in FIG. 11, the lengths in the time domain of the each of time slots of the three IDFT outputs 1140 are different. As described with reference to FIG. 5, generating the waveforms may cause a shift in the time domain of, for example, half of one symbol. To account for this shift, a frequency domain phase ramper may apply a frequency domain phase ramp to a corresponding waveform so that the resulting IDFT outputs 1140 may align. Thus, after being multiplexed over the frequency domain and the time domain, the information carried in each of the IDFT outputs 1140 may not overlap with each other. The three IDFT outputs 1140 are thus multiplexed over the frequency domain as well as the time domain, while maintaining a PAPR equivalent to that of a single-carrier data stream.

Figure 12:
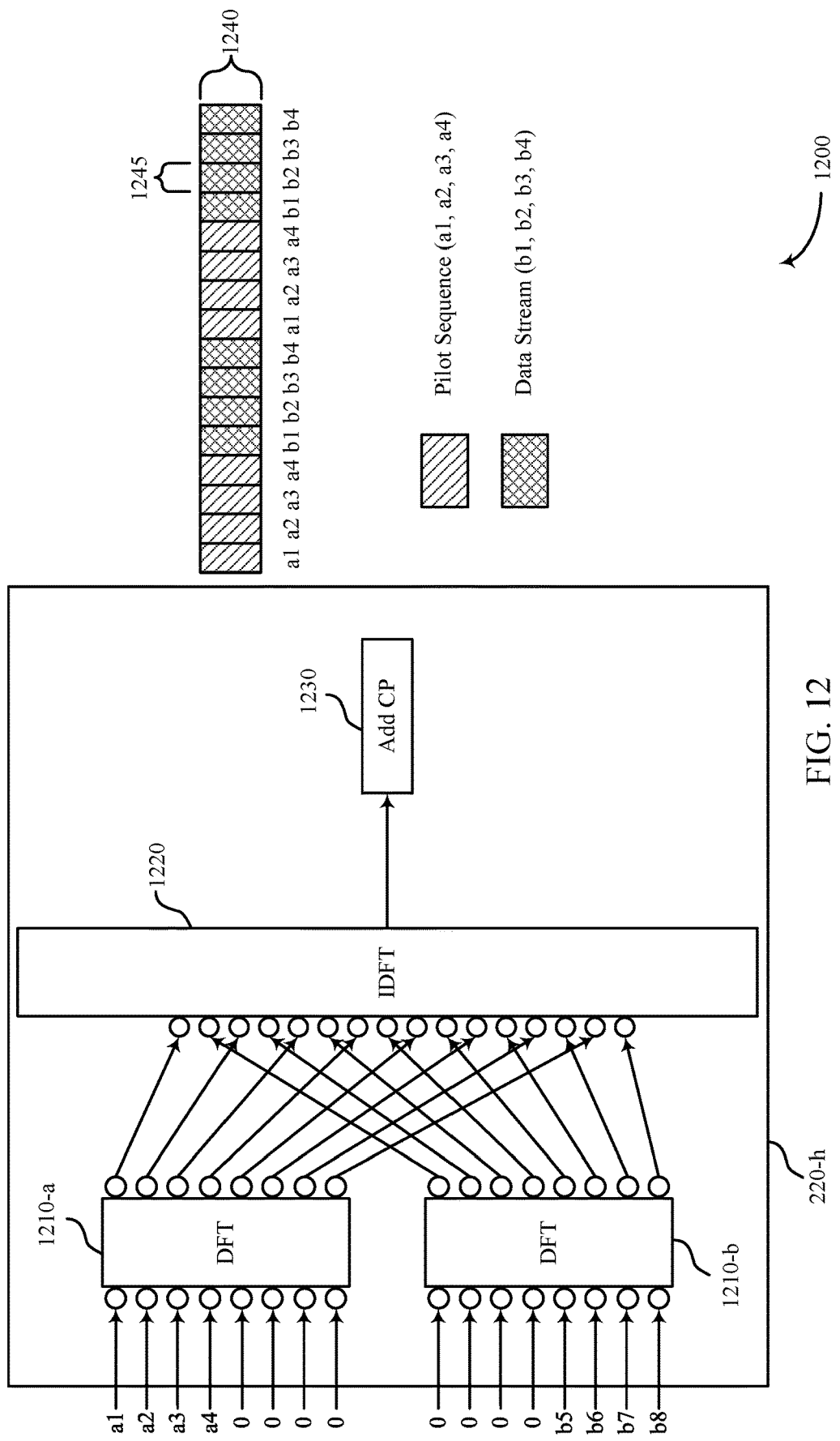
FIG. 12 through 17 illustrate example diagrams of transmission stream processors that support frequency and time domain multiplexing for low PAPR waveforms with multiple streams in accordance with aspects of the present disclosure.

FIG. 12 illustrates an example diagram 1200 of a transmission stream processor 220 that supports frequency and time domain multiplexing for low PAPR waveforms with multiple streams in accordance with aspects of the present disclosure. Transmission stream processor 220-h may provide for multiplexing multiple DFT-spread OFDM waveforms. In some examples, transmission stream processor 220-h may be an example of a transmission stream processor 220 as described with reference to FIG. 2. Transmission stream processor 220-h may include one or more DFT components 1210, an IDFT component 1220, and a cyclic prefix adder 1230. These components may be used to process bit streams for an uplink transmission from a UE 115. In some cases, the component of transmission stream processor 220-h may enable a certain pilot ratio for the transmission of reference signals in the same DFT-s-OFDM waveform as data with low PAPR. For instance, in the example of FIG. 12, transmission stream processor 220-h may be used to produce a pilot ratio of one half (½).

In some cases, the DFT components 1210 may receive respective streams (e.g., comprising multiple sets of symbols that have been mapped to respective subsets of time intervals) that are to be transmitted. In such cases, a first DFT component 1210-a may receive a stream comprising a first set of symbols (e.g., a1 through a4), a second DFT component 1210-b may receive another stream comprising a second set of symbols (e.g., b5 through b8), and so forth. In such cases, the first set of symbols may include pilot symbols and the second set of symbols may include data. The different sets of symbols may be multiplexed to subsets of a set of subcarriers, and the output 1240 from the IDFT component 1220 may correspond to a low PAPR time domain waveform with a pilot-to-data ratio of one half. That is, the output 1240 may include multiple time slots 1245, and one half of the time slots 1245 correspond to the pilot symbols. In such cases, transmission stream processor 220-h may, for example, use a DFT size of eight, and an upsampling ratio of two.

Figure 13:
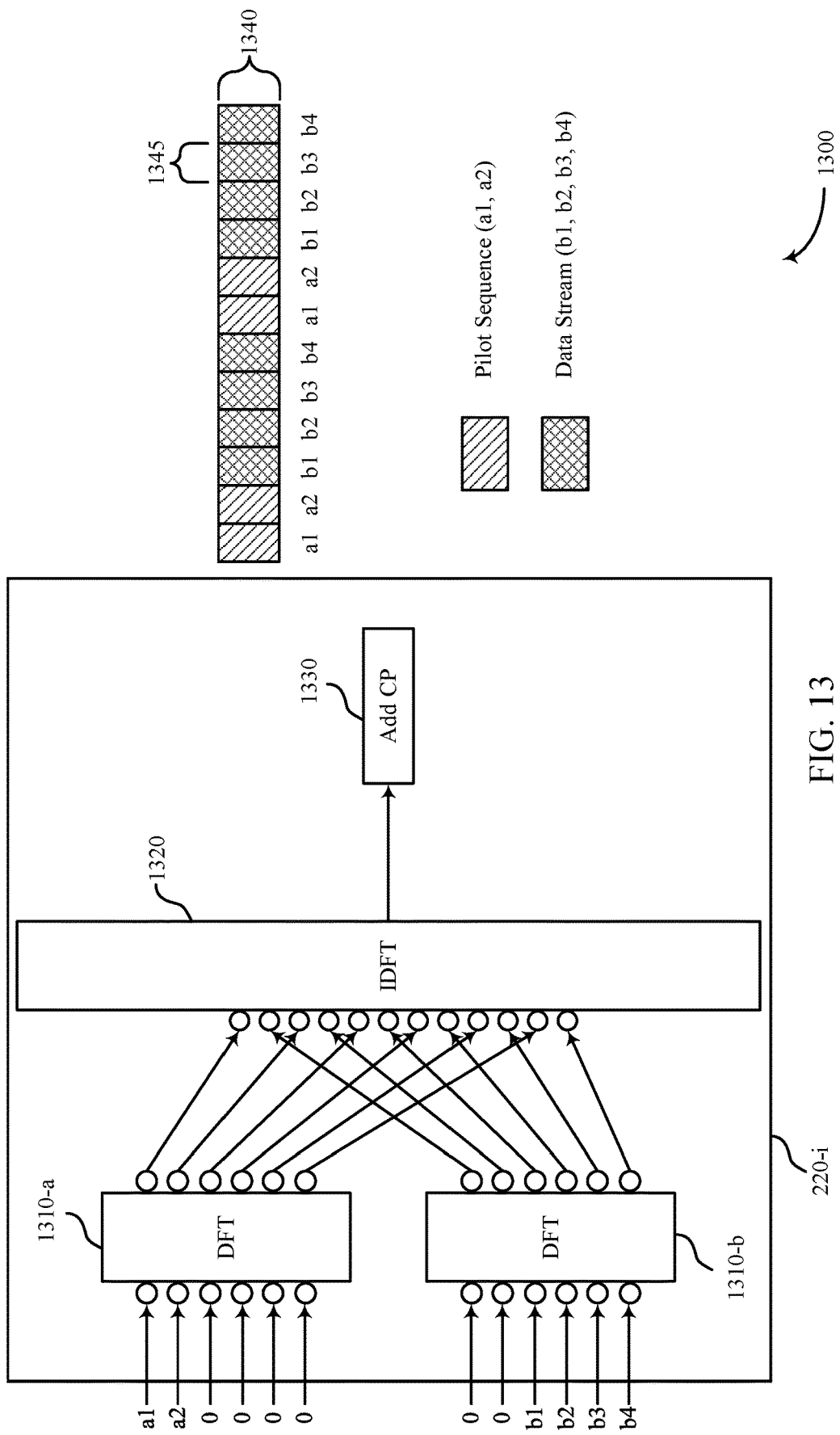

FIG. 13 illustrates an example diagram 1300 of a transmission stream processor 220 that supports frequency and time domain multiplexing for low PAPR waveforms with multiple streams in accordance with aspects of the present disclosure. Transmission stream processor 220-i may provide for multiplexing multiple DFT-spread OFDM waveforms. In some examples, transmission stream processor 220-i may be an example of a transmission stream processor 220 as described with reference to FIG. 2. Transmission stream processor 220-i may include one or more DFT components 1310, an IDFT component 1320, and a cyclic prefix adder 1330. These components may be used to process bit streams for an uplink transmission from a UE 115. In some cases, the component of transmission stream processor 220-i may enable a certain pilot ratio for the transmission of reference signals with low PAPR. For instance, in the example of FIG. 13, transmission stream processor 220-i may be used to produce a pilot ratio of one third (⅓).

In some cases, the DFT components 1310 may receive respective streams (e.g., comprising multiple sets of symbols that have been mapped to respective subsets of time intervals) that are to be transmitted. In such cases, a first DFT component 1310-a may receive a stream comprising a first set of symbols (e.g., a1 and a2), a second DFT component 1310-b may receive another stream comprising a second set of symbols (e.g., b1 through b4), and so forth. In such cases, the first set of symbols may include pilot symbols and the second set of symbols may include data. The different sets of symbols may be multiplexed to subsets of a set of subcarriers, and the output 1340 from the IDFT component 1320 may correspond to a low PAPR time domain waveform with a pilot-to-data ratio of one third. That is, the output 1340 may include multiple time slots 1345, and one third of the time slots 1345 correspond to pilot symbols. In such cases, transmission stream processor 220-i may, for example, use a DFT size of six, and an upsampling ratio of two.

Figure 14:
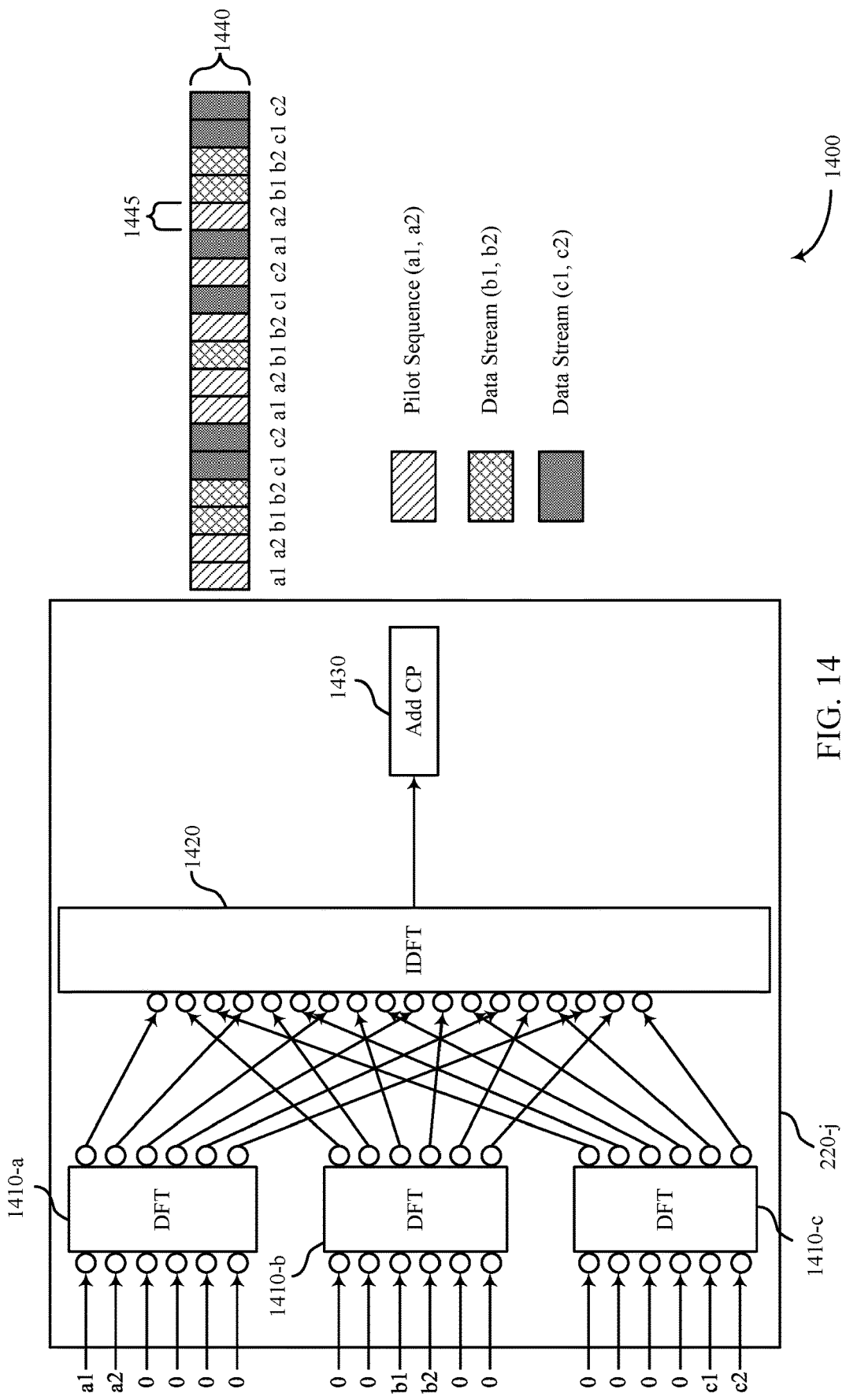

FIG. 14 illustrates an example diagram 1400 of a transmission stream processor 220 that supports frequency and time domain multiplexing for low PAPR waveforms with multiple streams in accordance with aspects of the present disclosure. Transmission stream processor 220-j may provide for multiplexing multiple DFT-spread OFDM waveforms. In some examples, transmission stream processor 220-j may be an example of a transmission stream processor 220 as described with reference to FIG. 2. Transmission stream processor 220-j may include one or more DFT components 1410, an IDFT component 1420, and a cyclic prefix adder 1430. These components may be used to process bit streams for an uplink transmission from a UE 115. In some cases, the component of transmission stream processor 220-j may enable a certain pilot ratio for the transmission of reference signals with low PAPR. For instance, in the example of FIG. 14, transmission stream processor 220-j may be used to produce a pilot ratio of one third (⅓).

In some cases, the DFT components 1410 may receive respective streams (e.g., comprising multiple sets of symbols that have been mapped to respective subsets of time intervals) that are to be transmitted. In such cases, a first DFT component 1410-a may receive a stream comprising a first set of symbols (e.g., a1 and a2), a second DFT component 1410-b may receive another stream comprising a second set of symbols (e.g., b1 and b2), and a third DFT component 1410-*c* may receive another stream corresponding to a third set of symbols (e.g., c1 and c2). In such cases, the first set of symbols may include pilot symbols and the second and third set of symbols may include data (e.g., from different data sources or channels, etc.). The different sets of symbols may be multiplexed to subsets of a set of subcarriers, and the output 1440 from the IDFT component 1420 may correspond to a low PAPR time domain waveform with a pilot-to-data ratio of one third. That is, the output 1440 may include multiple time slots 1445 in a symbol period, and one third of the time slots 1445 correspond to pilot symbols. In such cases, transmission stream processor 220-*j* may, for example, use a DFT size of six, and an upsampling ratio of three.

Figure 15:
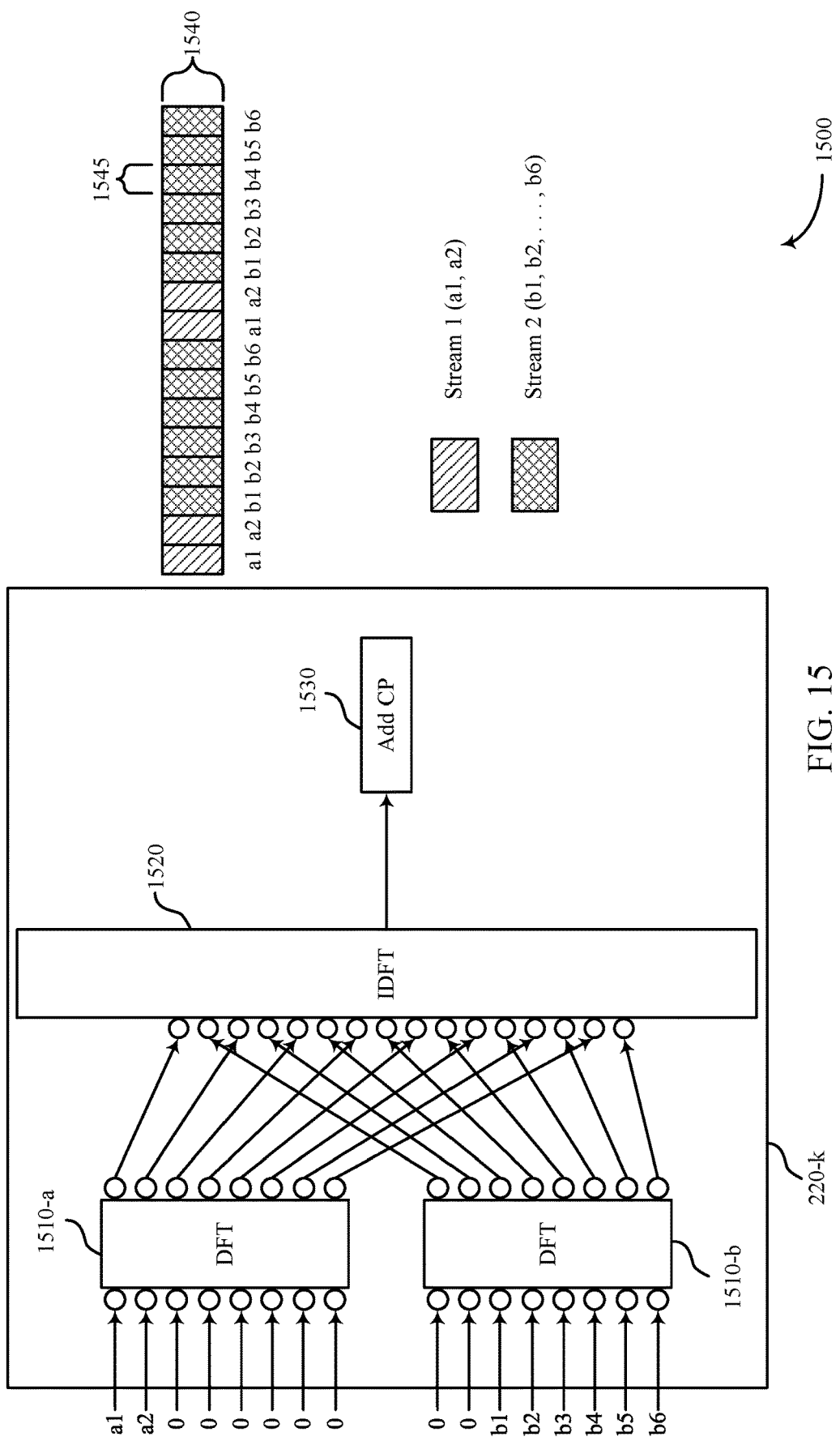

FIG. 15 illustrates an example diagram 1500 of a transmission stream processor 220 that supports frequency and time domain multiplexing for low PAPR waveforms with multiple streams in accordance with aspects of the present disclosure. Transmission stream processor 220-*k* may provide for multiplexing multiple DFT-spread OFDM waveforms. In some examples, transmission stream processor 220-*k* may be an example of a transmission stream processor 220 as described with reference to FIG. 2. Transmission stream processor 220-*k* may include one or more DFT components 1510, an IDFT component 1520, and a cyclic prefix adder 1530. These components may be used to process bit streams for an uplink transmission from a UE 115. In some cases, the component of transmission stream processor 220-*k* may enable a certain pilot ratio for the transmission of reference signals with low PAPR. For instance, in the example of FIG. 15, transmission stream processor 220-*k* may be used to produce a pilot ratio of one fourth (¼).

In some cases, the DFT components 1510 may receive respective streams (e.g., comprising multiple sets of symbols that have been mapped to respective subsets of time intervals) that are to be transmitted. In such cases, a first DFT component 1510-*a* may receive a stream comprising a first set of symbols (e.g., a1 and a2), and a second DFT component 1510-*b* may receive another stream comprising a second set of symbols (e.g., b1 through b6). In such cases, the first set of symbols may include pilot symbols and the second set of symbols may include data. The different sets of symbols may be multiplexed to subsets of a set of subcarriers, and the output 1540 from the IDFT component 1520 may correspond to a low PAPR time domain waveform with a pilot-to-data ratio of one fourth. That is, the output 1540 may include multiple time slots 1545, and one fourth of the time slots 1545 correspond to pilot symbols. In such cases, transmission stream processor 220-*k* may, for example, use a DFT size of eight, and an upsampling ratio of two.

Figure 16:
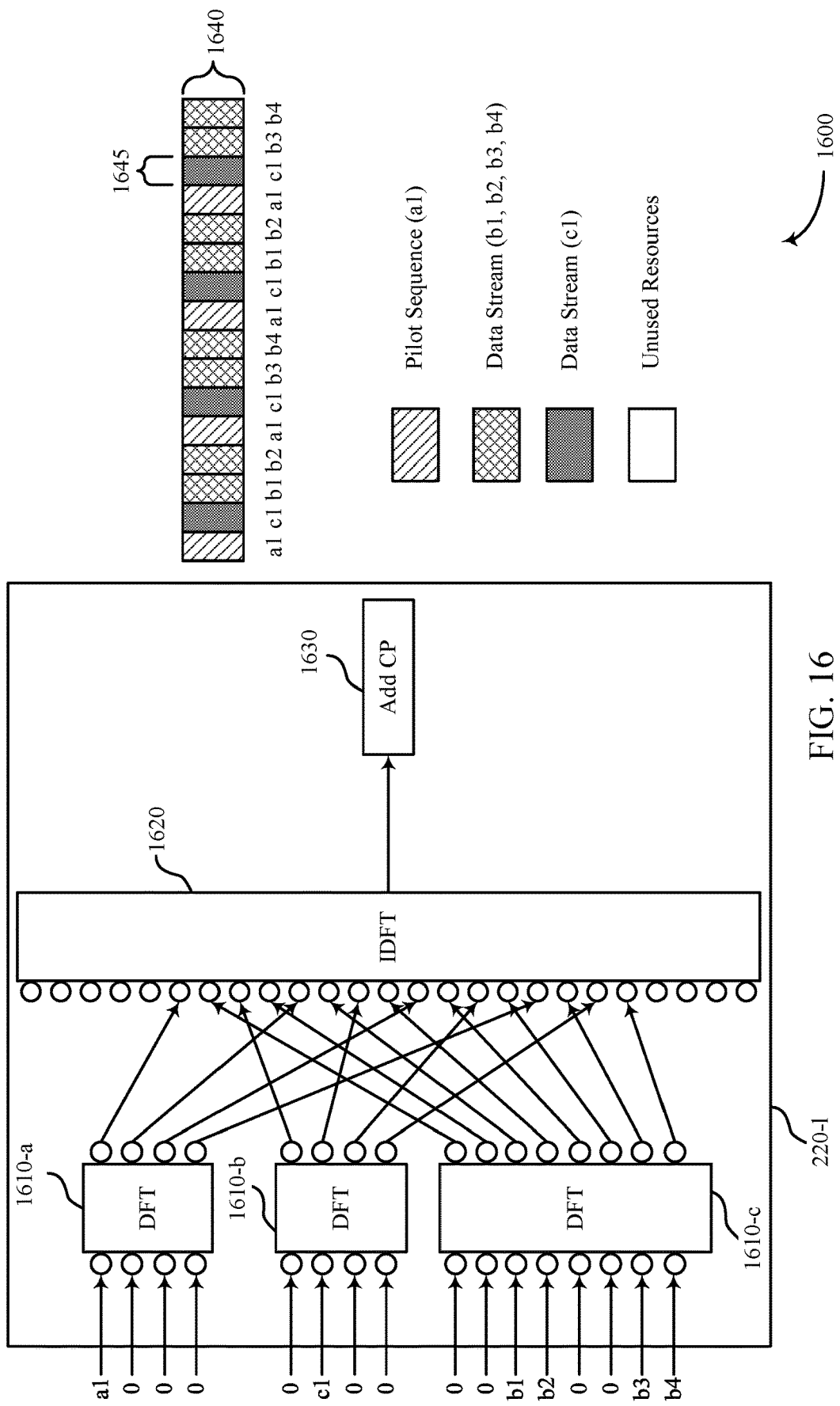

FIG. 16 illustrates an example diagram 1600 of a transmission stream processor 220 that supports frequency and time domain multiplexing for low PAPR waveforms with multiple streams in accordance with aspects of the present disclosure. Transmission stream processor 220-1 may provide for multiplexing multiple DFT-spread OFDM waveforms. In some examples, transmission stream processor 220-1 may be an example of a transmission stream processor 220 as described with reference to FIG. 2. Transmission stream processor 220-1 may include one or more DFT components 1610, an IDFT component 1620, and a cyclic prefix adder 1630. These components may be used to process bit streams for an uplink transmission from a UE 115. In some examples, the DFT components 1610 may be associated with the same or different DFT sizes. For instance, a first DFT component 1610-*a* may have a DFT size of four, a second DFT component 1610-*b* may have a DFT size of four, and a third DFT component 1610-*c* may have a DFT size of eight. That is, DFT size may be different or may vary between respective DFT components 1610 used for processing bit streams for an uplink transmission. In some cases, the component of transmission stream processor 220-1 may enable a certain pilot ratio for the transmission of reference signals with low PAPR. For instance, in the example of FIG. 16, transmission stream processor 220-1 may be used to produce a pilot ratio of one fourth (¼).

In some cases, the DFT components 1610 may receive respective streams (e.g., comprising multiple sets of symbols that have been mapped to respective subsets of time intervals) that are to be transmitted. In such cases, a first DFT component 1610-*a* may receive a stream comprising a first set of symbols (e.g., a1 and a2), a second DFT component 1610-*b* may receive another stream comprising a second set of symbols (e.g., c1 and c2), and a third DFT component 1610-*c* may receive another stream corresponding to a third set of symbols (e.g., b1 through b4). In such cases, the first set of symbols may include pilot symbols and the second and third set of symbols may include data. The different sets of symbols may be multiplexed to subsets of a set of subcarriers, and the output 1640 from the IDFT component 1620 may correspond to a low PAPR time domain waveform with a pilot-to-data ratio of one third. That is, the output 1640 may include multiple time slots 1645, and one third of the time slots 1645 correspond to pilot symbols. In such cases, transmission stream processor 220-*j* may, for example, use an upsampling ratio of two or four. That is, the different sets of symbols maybe multiplexed using different upsampling ratios.

Figure 17:
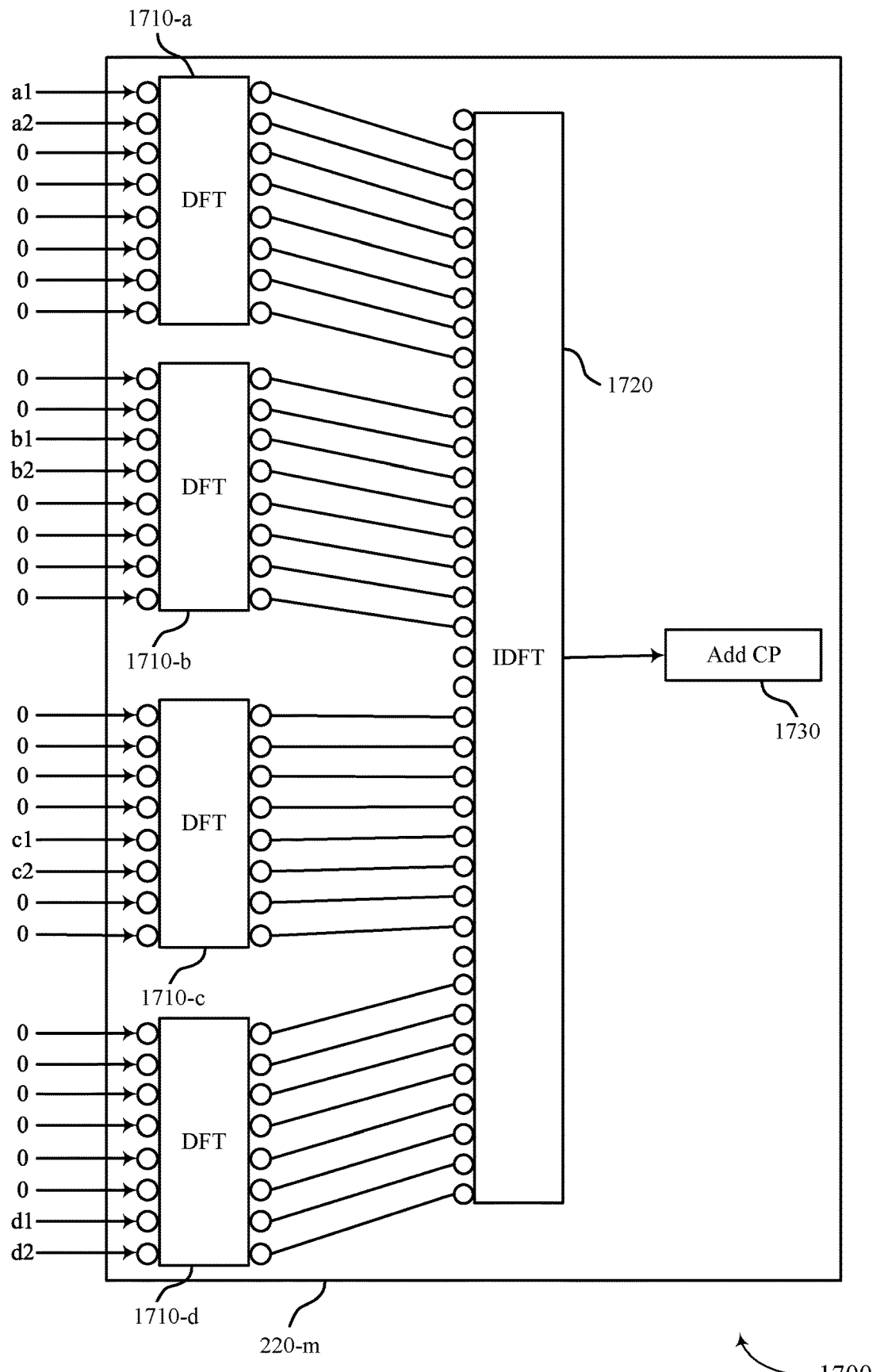

FIG. 17 illustrates an example diagram 1700 of a transmission stream processor 220 that supports frequency and time domain multiplexing for low PAPR waveforms with multiple streams in accordance with aspects of the present disclosure. Transmission stream processor 220-*m* may provide for multiplexing multiple DFT-spread OFDM waveforms. In some examples, transmission stream processor 220-*m* may be an example of a transmission stream processor 220 as described with reference to FIG. 2. Transmission stream processor 220-*m* may include one or more DFT components 1710, an IDFT component 1720, and a cyclic prefix adder 1730. These components may be used to process bit streams for an uplink transmission from a UE 115. In some cases, techniques implemented at transmission stream processor 220-*m* may be used to achieve frequency diversity and low PAPR for the transmission of control or random access channels, such as PUCCH and physical random access channel (PRACH) signaling, respectively.

In the example of FIG. 17, the DFT components 1710 may receive respective streams (e.g., comprising multiple sets of symbols that have been mapped to respective subsets of time intervals) that are to be multiplexed and transmitted with non-contiguous or non-overlapping subcarriers. In such cases, a first DFT component 1710-*a* may receive a stream including a first set of symbols (e.g., a1 and a2), a second DFT component may receive another stream including a second set of symbols (e.g., b1 and b2), and so forth. Each stream may include, for example, symbols with control or random access information to be transmitted to a receiver. For instance, the streams may comprise separate clusters of a PUCCH to be transmitted by the UE 115. Additionally, each stream may include different sequences of symbols containing information or data, where some symbols may not contain information or data. Transmission stream processor 220-*m* may, for example, use a DFT size of eight, and an upsampling ratio of one. Additionally, to achieve frequency diversity, the respective subsets of subcarriers that the signal is mapped to may be non-contiguous with respect to each other.

Figure 18:
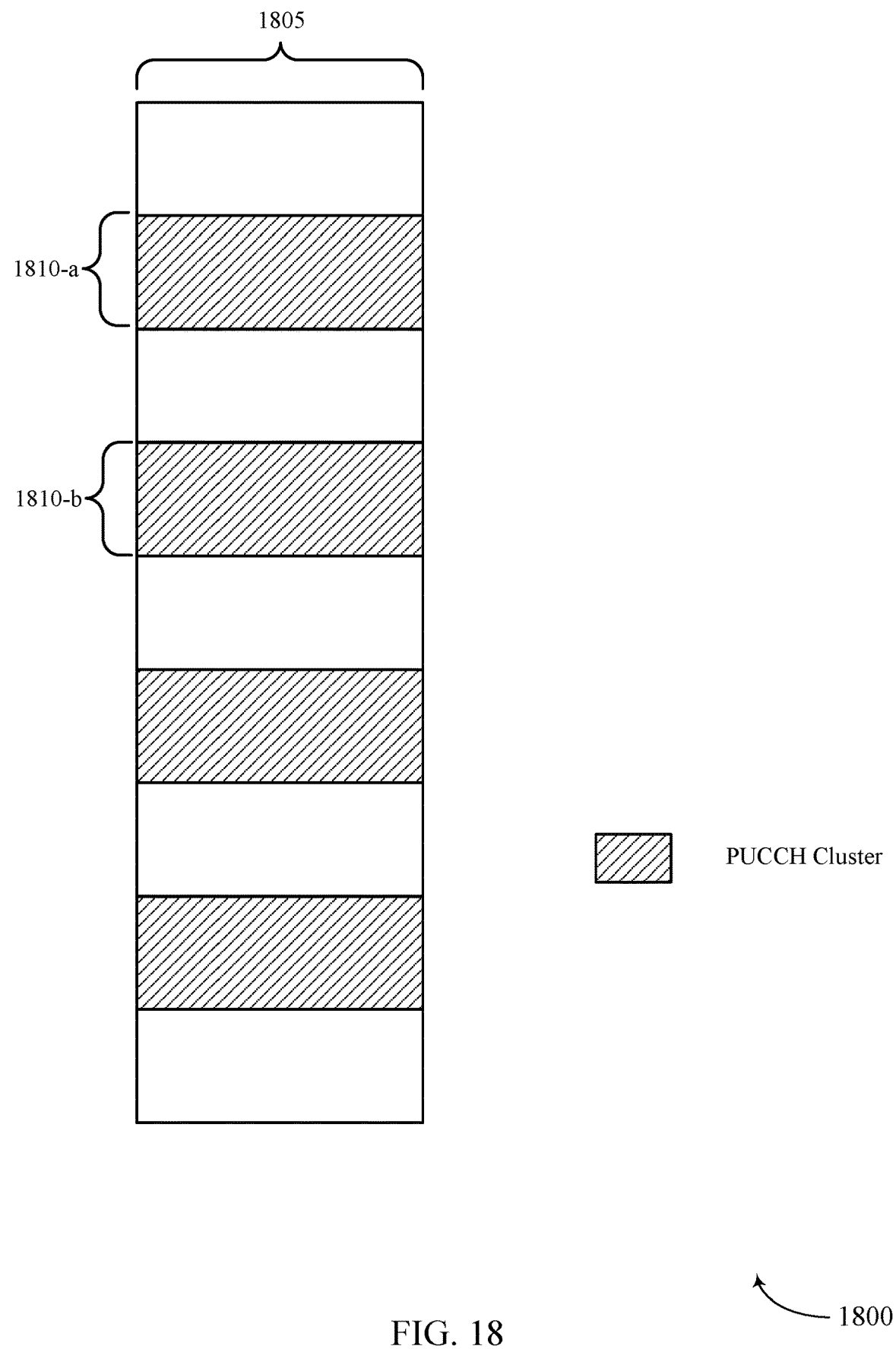
FIG. 18 illustrates an example of a signal configuration in a system that supports frequency and time domain multiplexing for low PAPR waveforms with multiple streams in accordance with aspects of the present disclosure.

FIG. 18 illustrates an example of a signal configuration 1800 in a system that supports frequency and time domain multiplexing for low PAPR waveforms with multiple streams in accordance with aspects of the present disclosure. In some examples, the signal configuration 1800 may correspond to a low PAPR waveform generated by transmission stream processor 220 (e.g., a transmission stream processor 220-*m* as described with reference to FIG. 17). Signal configuration 1800 may be an example a control channel (e.g., PUCCH) transmitted over non-contiguous subcarriers. Additionally or alternatively, a transmission of a random access channel (e.g., a PRACH), or other signaling may be transmitted according to signal configuration 1800.

In some cases, signal configuration 1800 may correspond to a signal transmitted over a symbol period 1805, and may include different clusters 1810 of control (or random access) information, where clusters 1810 may correspond to different streams received at a transmission stream processor 220. For example, a first cluster 1810-*a* may correspond to a first stream that includes a first set of symbols, and a second cluster 1810-*b* may correspond to a second stream that includes a second set of symbols. Due to the separation of the different clusters 1810 containing control information, the time domain waveform may be associated with frequency diversity, and also have a low PAPR due to multiplexing the different streams using time domain and frequency domain mapping. Additionally, through the use of various DFT sizes, interlacing, and upsampling ratios, signal configuration 1800 may include a different pattern of clusters 1810 that are not illustrated in FIG. 18.

Figure 19:
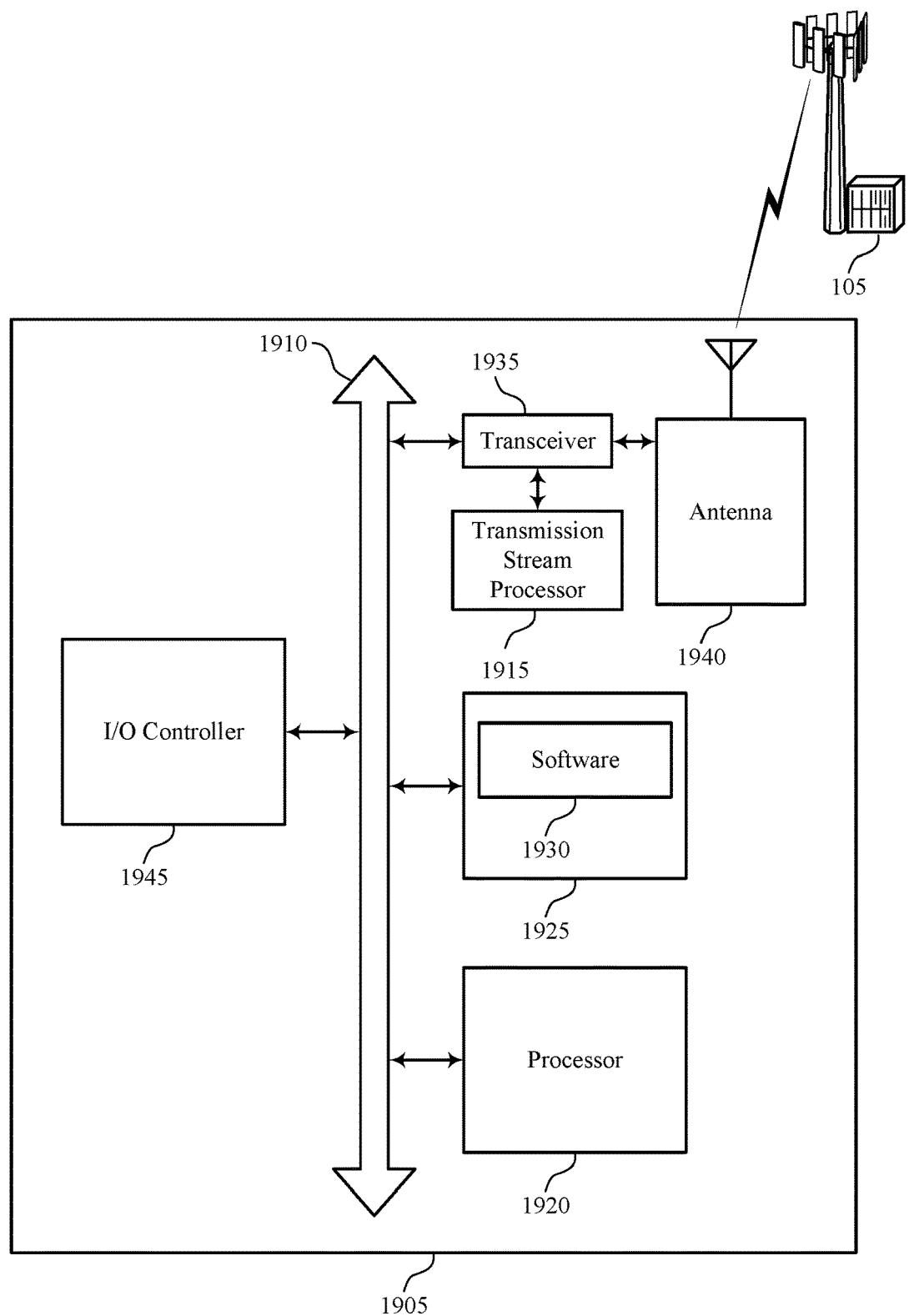
FIG. 19 illustrates a block diagram of a system including a device that supports frequency and time domain multiplexing for low PAPR waveforms with multiple streams in accordance with aspects of the present disclosure.

FIG. 19 illustrates a block diagram of a system 1900 including a device 1905 that supports frequency and time domain multiplexing for low PAPR waveforms with multiple streams in accordance with aspects of the present disclosure. Device 1905 may be an example of or include the components of a UE 115 described with reference to FIGS. 1 through 18. Device 1905 may include components for bi-directional voice and data communications including components for transmitting and receiving communications, including a transmission stream processor 1915, processor 1920, memory 1925, software 1930, transceiver 1935, antenna 1940, and I/O controller 1945. These components may be in electronic communication via one or more busses (e.g., bus 1910). Device 1905 may communicate wirelessly with one or more base stations 105 or UEs 115.

Processor 1920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1920 may be configured to operate a memory array using a memory controller. In other cases, a memory controller may be integrated into processor 1920. Processor 1920 may be configured to execute computer-readable instructions stored in a memory to perform various functions (e.g., functions or tasks supporting frequency and time domain multiplexing for low PAPR waveform design with multiple streams).

Memory 1925 may include random access memory (RAM) and read only memory (ROM). The memory 1925 may store computer-readable, computer-executable software 1930 including instructions that, when executed, cause the processor to perform various functions described herein. In some cases, the memory 1925 may contain, among other things, a basic input/output system (BIOS) which may control basic hardware and/or software operation such as the interaction with peripheral components or devices.

Software 1930 may include code to implement aspects of the present disclosure, including code to support frequency and time domain multiplexing for low PAPR waveform design with multiple streams. Software 1930 may be stored in a non-transitory computer-readable medium such as system memory or other memory. In some cases, the software 1930 may not be directly executable by the processor but may cause a computer (e.g., when compiled and executed) to perform functions described herein.

Transceiver 1935 may coordinate with a transmission stream processor 1915 to process signals for uplink transmission. For example, transmission stream processor 1915 may include aspects of transmission stream processors 220 as described with reference to FIGS. 2-8, 10, and 12-17. In some cases, transmission stream processor 1915 may identify a plurality of sets of symbols for a transmission in a symbol period, each of the plurality of sets of symbols associated with a different stream, map the plurality of sets of symbols to respective subsets of a plurality of time intervals, perform respective time to frequency domain transforms on the plurality of mapped sets of symbols over respective time to frequency domain transform sizes to obtain a plurality of frequency domain signals, and apply respective frequency domain phase ramps to the plurality of frequency domain signals. Additionally, transmission stream processor 1915 may map the plurality of phase ramped frequency domain signals to respective subsets of a set of subcarriers, generate a time domain waveform for the transmission based on a frequency to time domain transform of the mapped plurality of phase ramped frequency domain signals to the set of subcarriers, and transmit the time domain waveform to a receiver.

In some cases, transmission stream processor 1915 may determine the respective subsets of the set of time intervals based on the respective time to frequency domain transform size, determine the respective subsets of the set of time intervals based on frequency domain upsampling factors of the respective subsets of the set of subcarriers, determine the respective subsets of the set of time intervals based on a transform size of the frequency to time domain transform, or determine the respective subsets of the respective set of time intervals based on the respective frequency domain phase ramps. In some examples, transmission stream processor 1915 may map the sets of symbols to respective subsets of a respective set of time intervals of the symbol period. In some cases, the respective time to frequency domain transform sizes of at least two of the respective time to frequency domain transforms are a same transform size. Alternatively, the respective time to frequency domain transform sizes of at least two of the respective time to frequency domain transforms may be different with respect to each other.

In some examples, frequency domain upsampling factors of at least two of the respective subsets of the set of subcarriers are a same upsampling factor. In some examples, frequency domain upsampling factors of at least two of the respective subsets of the set of sub carriers are different with respect to each other. Transmission stream processor 1915 may also perform a frequency to time domain transform on a frequency domain sequence to obtain reference signal sequences, data streams, or a combination thereof. In some cases, the respective subsets of the set of subcarriers are non-contiguous with respect to each other. In some cases, the sets of symbols are orthogonal to each other within the time domain waveform. In some cases, the respective subsets of the set of subcarriers are orthogonal with respect to each other.

In some examples, at least two of the respective subsets of the set of subcarriers include interleaved subcarriers with respect to each other. In some cases, a first set of symbols of the plurality of sets of symbols includes a first type of information (e.g., reference signal sequences, data streams, control information, etc.) and a second set of symbols of the plurality of sets of symbols includes a second, different type of information. In some cases, at least one of the sets of symbols may include reference signal sequences, data streams, or a combination thereof. In some cases, the respective subset of the set of time intervals for the at least one of the sets of symbols includes a first subset of the set of time intervals assigned to a first wireless device that is different from a second subset of the set of time intervals assigned to a second wireless device for reference signal transmission. In some cases, the respective subsets of the set of time intervals are orthogonal with respect to each other.

Transceiver 1935 may communicate bi-directionally, via one or more antennas, wired, or wireless links as described above. For example, the transceiver 1935 may represent a wireless transceiver and may communicate bi-directionally with another wireless transceiver. The transceiver 1935 may include components such as digital-to-analog or analog-to-digital converters, downconverters, upconverters, filters, etc. In some cases, the wireless device may include a single antenna 1940. However, in some cases the device may have more than one antenna 1940, which may be capable of concurrently transmitting or receiving multiple wireless transmissions.

I/O controller 1945 may manage input and output signals for device 1905. I/O controller 1945 may also manage peripherals not integrated into device 1905. In some cases, I/O controller 1945 may represent a physical connection or port to an external peripheral. In some cases, I/O controller 1945 may utilize an operating system such as iOS®, ANDROID®, MS-DOS®, MS-WINDOWS®, OS/2®, UNIX®, LINUX®, or another known operating system. In other cases, I/O controller 1945 may represent or interact with a modem, a keyboard, a mouse, a touchscreen, or a similar device. In some cases, I/O controller 1945 may be implemented as part of a processor. In some cases, a user may interact with device 1905 via I/O controller 1945 or via hardware components controlled by I/O controller 1945.

Figure 20:
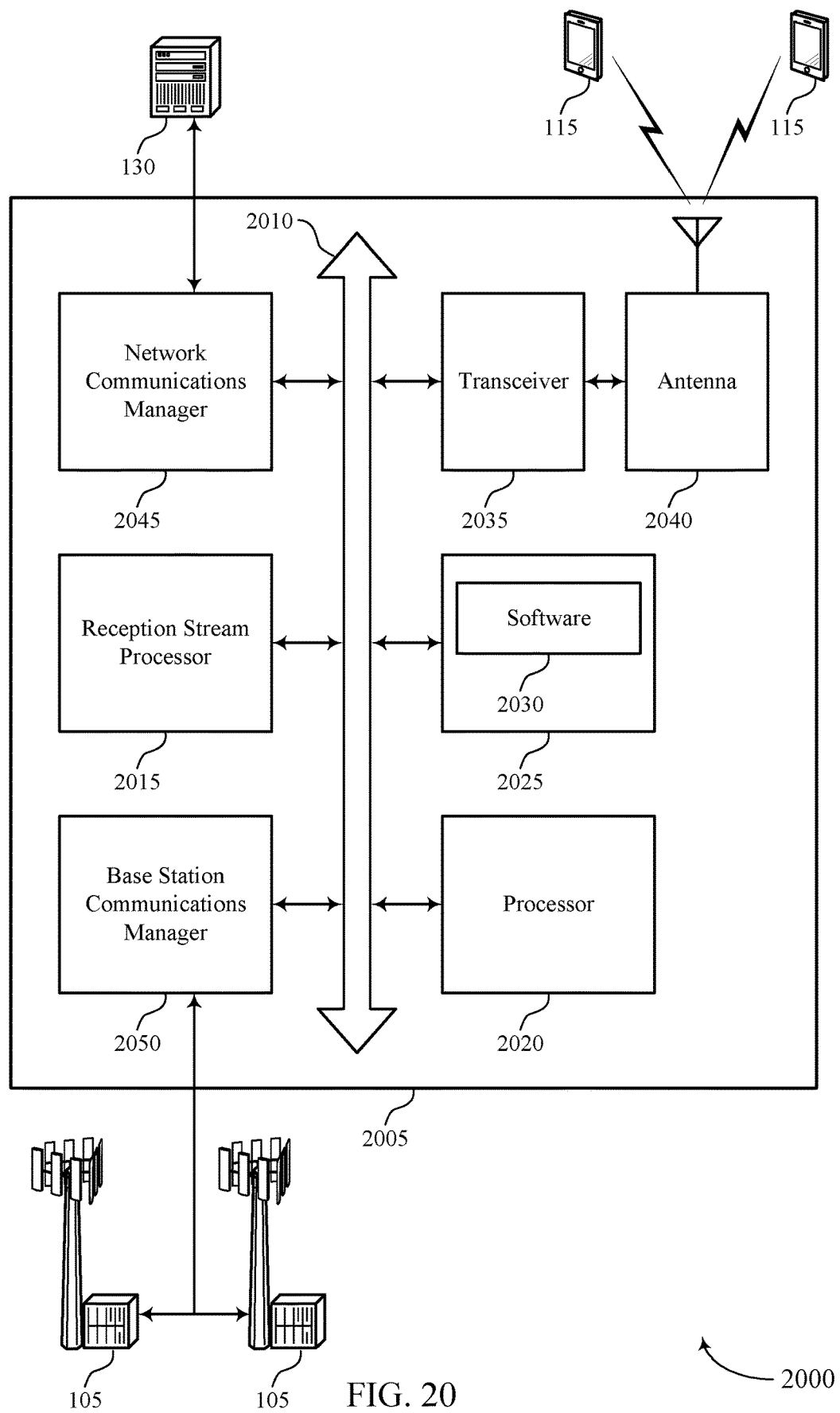
FIG. 20 illustrates a block diagram of a system including a base station that supports frequency and time domain multiplexing for low PAPR waveforms with multiple streams in accordance with aspects of the present disclosure.

FIG. 20 illustrates a block diagram of a system 2000 including a device 2005 that supports frequency and time domain multiplexing for low PAPR waveforms with multiple streams in accordance with aspects of the present disclosure. Device 2005 may be an example of or include the components of a base station as described with reference to FIGS. 1 and 2. Device 2005 may include components for bi-directional voice and data communications including components for transmitting and receiving communications, including reception stream processor 2015, processor 2020, memory 2025, software 2030, transceiver 2035, antenna 2040, network communications manager 2045, and base station communications manager 2050. These components may be in electronic communication via one or more busses (e.g., bus 2010). Device 2005 may communicate wirelessly with one or more UEs 115. Specifically, reception stream processor 2015 may include components corresponding to the inverse functions (e.g., cyclic prefix removal, DFT, de-mapping, de-spreading, phase ramp removal, etc.) to the functions of a transmission stream processor 220 as described with reference to FIGS. 2-8, 10, and 12-17. Although illustrated as implemented in a device 2005 including the components of a base station 105, a reception stream processor 2015 may be implemented in any wireless communications device such as an access point, repeater, relay station, or UE 115.

Processor 2020 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 2020 may be configured to operate a memory array using a memory controller. In other cases, a memory controller may be integrated into processor 2020. Processor 2020 may be configured to execute computer-readable instructions stored in a memory to perform various functions (e.g., functions or tasks supporting frequency and time domain multiplexing for low PAPR waveform design with multiple streams).

Memory 2025 may include RAM and ROM. The memory 2025 may store computer-readable, computer-executable software 2030 including instructions that, when executed, cause the processor to perform various functions described herein. In some cases, the memory 2025 may contain, among other things, a BIOS which may control basic hardware and/or software operation such as the interaction with peripheral components or devices.

Software 2030 may include code to implement aspects of the present disclosure, including code to support frequency and time domain multiplexing for low PAPR waveform design with multiple streams. Software 2030 may be stored in a non-transitory computer-readable medium such as system memory or other memory. In some cases, the software 2030 may not be directly executable by the processor but may cause a computer (e.g., when compiled and executed) to perform functions described herein.

Transceiver 2035 may communicate bi-directionally, via one or more antennas, wired, or wireless links as described above. For example, the transceiver 2035 may represent a wireless transceiver and may communicate bi-directionally with another wireless transceiver. The transceiver 2035 may include components such as digital-to-analog or analog-to-digital converters, downconverters, upconverters, filters, etc. In some cases, the wireless device may include a single antenna 2040. However, in some cases the device may have more than one antenna 2040, which may be capable of concurrently transmitting or receiving multiple wireless transmissions.

Network communications manager 2045 may manage communications with the core network (e.g., via one or more wired backhaul links). For example, the network communications manager 2045 may manage the transfer of data communications for client devices, such as one or more UEs 115.

Base station communications manager 2050 may manage communications with other base station 105, and may include a controller or scheduler for controlling communications with UEs 115 in cooperation with other base stations 105. For example, the base station communications manager 2050 may coordinate scheduling for transmissions to UEs 115 for various interference mitigation techniques such as beamforming or joint transmission. In some examples, base station communications manager 2050 may provide an X2 interface within an LTE/LTE-A wireless communications network technology to provide communication between base stations 105.

Figure 21:
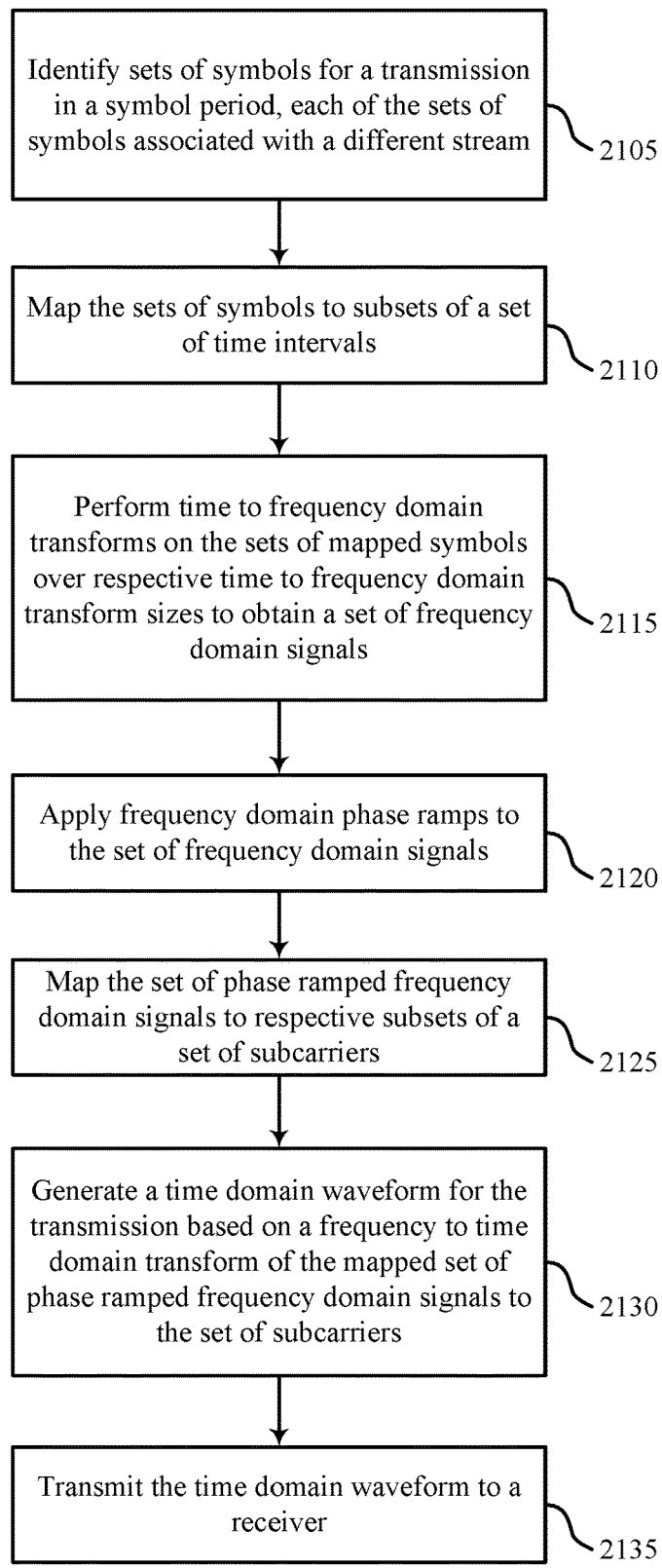
FIG. 21 shows a flowchart illustrating a method for frequency and time domain multiplexing for low PAPR waveform design with multiple streams in accordance with aspects of the present disclosure.

FIG. 21 shows a flowchart illustrating a method 2100 for frequency and time domain multiplexing for low PAPR waveform design with multiple streams in accordance with aspects of the present disclosure. The operations of method 2100 may be implemented by a UE 115 or its components as described herein. For example, the operations of method 2100 may be performed by a transmission stream processor as described with reference to FIG. 19. In some examples, a UE 115 may execute a set of codes to control the functional elements of the device to perform the functions described below. Additionally or alternatively, the UE 115 may perform aspects of the functions described below using special-purpose hardware.

At block 2105 the UE 115 may identify a plurality of sets of symbols for a transmission in a symbol period, each of the plurality of sets of symbols associated with a different stream. For example, the UE 115 may identify single-carrier streams (e.g., for the transmission of reference signals and data) to be transmitted to a base station 105. The UE 115 may further identify multiple OFDM symbols for transmitting the single-carrier streams. The operations of block 2105 may be performed according to the methods described herein. In some examples, aspects of the operations of block 2105 may be performed by a transmission stream processor as described with reference to FIGS. 2 through 19.

At block 2110 the UE 115 may map the plurality of sets of symbols to respective subsets of a plurality of time intervals. For instance, the multiple OFDM symbols may be mapped to time domain resources for subsequent spreading (e.g., at a component performing DFT spreading). The operations of block 2110 may be performed according to the methods described herein. In some examples, aspects of the operations of block 2110 may be performed by a time domain mapper as described with reference to FIGS. 2 through 19.

At block 2115 the UE 115 may perform respective time to frequency domain transforms on the plurality of mapped sets of symbols over respective time to frequency domain transform sizes to obtain a plurality of frequency domain signals. That is, a DFT may be performed that spreads the mapped OFDM symbols to respective frequency domain signals. The operations of block 2115 may be performed according to the methods described herein. In some examples, aspects of the operations of block 2115 may be performed by a DFT component as described with reference to FIGS. 2 through 19.

At block 2120 the UE 115 may apply respective frequency domain phase ramps to the plurality of frequency domain signals. For example, phase modulation may be performed such that a phase shift is applied to the frequency domain signals. The phase ramps may be applied such that a time delay may be introduced to the frequency domain signals when transformed to a time domain (e.g., a phase ramp applied to the frequency domain signals may correspond to a time shift in the time domain). The operations of block 2120 may be performed according to the methods described herein. In some examples, aspects of the operations of block 2120 may be performed by a frequency domain phase ramper as described with reference to FIGS. 2 through 19.

At block 2125 the UE 115 may map the plurality of phase ramped frequency domain signals to respective subsets of a set of subcarriers. For example, a set of subcarriers may be identified for the transmission of the phase ramped frequency domain signals for a subsequent transform to a time domain signal. The operations of block 2125 may be performed according to the methods described herein. In some examples, aspects of the operations of block 2125 may be performed by a frequency domain tone mapper as described with reference to FIGS. 2 through 19.

At block 2130 the UE 115 may generate a time domain waveform for the transmission based on a frequency to time domain transform of the mapped plurality of phase ramped frequency domain signals to the set of subcarriers. The time domain waveform may be generated using an IDFT. The operations of block 2130 may be performed according to the methods described herein. In some examples, aspects of the operations of block 2130 may be performed by an IDFT component as described with reference to FIGS. 2 through 19.

At block 2135 the UE 115 may transmit the time domain waveform to a receiver. That is, the time domain waveform may be wirelessly transmitted to the base station 105 using time-frequency resources carrying the time domain waveform. The operations of block 2135 may be performed according to the methods described herein. In some examples, aspects of the operations of block 2135 may be performed by a transceiver as described with reference to FIG. 19.

In some examples, aspects from two or more of the described methods may be combined. It should be noted that the described methods are just example implementations, and that the operations of the methods may be rearranged or otherwise modified such that other implementations are possible.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) radio frequency spectrum bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 as described with reference to FIGS. 1 and 2—may include one or more carriers, where each carrier may be a signal made up of multiple subcarriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C, as well as any combination with multiples of the same element (e.g., A-A A-A-A, A-A-B, A-A-C, A-B-B, A-C-C, B-B, B-B-B, B-B-C, C-C, and C-C-C or any other ordering of A, B, and C).

As used herein, the phrase "based on" shall not be construed as a reference to a closed set of conditions. For example, an exemplary feature that is described as "based on condition A" may be based on both a condition A and a condition B without departing from the scope of the present disclosure. As used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   identifying a plurality of sets of symbols for a transmission in a symbol period, each of the plurality of sets of symbols associated with a different stream;
   mapping the plurality of sets of symbols to respective subsets of a plurality of time intervals, wherein a first set of symbols of the plurality of sets of symbols is mapped to the respective subset of the plurality of time intervals with at least one base value;
   performing respective time to frequency domain transforms on the plurality of mapped sets of symbols over respective time to frequency domain transform sizes to obtain a plurality of frequency domain signals;
   applying respective frequency domain phase ramps to the plurality of frequency domain signals;
   mapping the plurality of phase ramped frequency domain signals to respective subsets of a set of subcarriers;
   generating a time domain waveform for the transmission based on a frequency to time domain transform of the mapped plurality of phase ramped frequency domain signals to the set of subcarriers; and
   transmitting, by a wireless device, the time domain waveform to a receiver.

2. The method of claim 1, further comprising:
   determining the respective subsets of the plurality of time intervals based at least in part on the respective time to frequency domain transform size.

3. The method of claim 1, further comprising:
   determining the respective subsets of the plurality of time intervals based at least in part on frequency domain upsampling factors of the respective subsets of the set of subcarriers.

4. The method of claim 1, further comprising:
   determining the respective subsets of the plurality of time intervals based at least in part on a transform size of the frequency to time domain transform.

5. The method of claim 1, further comprising:
   determining the respective subsets of the plurality of time intervals based at least in part on the respective frequency domain phase ramps.

6. The method of claim 1, wherein the plurality of sets of symbols are orthogonal to each other within the time domain waveform.

7. The method of claim 1, wherein the respective subsets of the plurality of time intervals are orthogonal with respect to each other.

8. The method of claim 1, wherein the respective subsets of the set of subcarriers are orthogonal with respect to each other.

9. The method of claim 1, wherein at least two of the respective subsets of the set of subcarriers comprise interleaved subcarriers with respect to each other.

10. The method of claim 1, wherein the respective time to frequency domain transform sizes of at least two of the respective time to frequency domain transforms are a same transform size or are different with respect to each other.

11. The method of claim 1, wherein frequency domain upsampling factors of at least two of the respective subsets of the set of subcarriers are a same upsampling factor or are different with respect to each other.

12. The method of claim 1, wherein the first set of symbols of the plurality of sets of symbols comprises a first type of information and a second set of symbols of the plurality of sets of symbols comprises a second, different type of information.

13. The method of claim 1, wherein the plurality of sets of symbols comprises reference signal sequences, data streams, or a combination thereof.

14. The method of claim 13, wherein the respective subset of the plurality of time intervals for the at least one of the plurality of sets of symbols comprises a first subset of the plurality of time intervals assigned to a first wireless device that is different from a second subset of the plurality of time intervals assigned to a second wireless device for reference signal transmission.

15. The method of claim 13, further comprising:
performing a frequency to time domain transform on a frequency domain sequence to obtain the reference signal sequences, the data streams, or a combination thereof.

16. The method of claim 1, wherein the respective subsets of the set of subcarriers are non-contiguous with respect to each other.

17. The method of claim 1, wherein the at least one base value is a null symbol or zero.

18. An apparatus for wireless communication, comprising:
means for identifying a plurality of sets of symbols for a transmission in a symbol period, each of the plurality of sets of symbols associated with a different stream;
means for mapping the plurality of sets of symbols to respective subsets of a plurality of time intervals, wherein a first set of symbols of the plurality of sets of symbols is mapped to the respective subset of the plurality of time intervals with at least one base value;
means for performing respective time to frequency domain transforms on the plurality of mapped sets of symbols over the respective time to frequency domain transform sizes to obtain a plurality of frequency domain signals;
means for applying respective frequency domain phase ramps to the plurality of frequency domain signals;
means for mapping the plurality of phase ramped frequency domain signals to respective subsets of a set of subcarriers;
means for generating a time domain waveform for the transmission based on a frequency to time domain transform of the mapped plurality of phase ramped frequency domain signals to the set of subcarriers; and
means for transmitting the time domain waveform to a receiver.

19. The apparatus of claim 18, further comprising:
means for determining the respective subsets of the plurality of time intervals based at least in part on the respective time to frequency domain transform size.

20. The apparatus of claim 18, further comprising:
means for determining the respective subsets of the plurality of time intervals based at least in part on frequency domain upsampling factors of the respective subsets of the set of subcarriers.

21. The apparatus of claim 18, further comprising:
means for determining the respective subsets of the plurality of time intervals based at least in part on a transform size of the frequency to time domain transform.

22. The apparatus of claim 18, further comprising:
means for determining the respective subsets of the plurality of time intervals based at least in part on the respective frequency domain phase ramps.

23. An apparatus for wireless communication, in a system comprising:
a processor;
memory in electronic communication with the processor; and
instructions stored in the memory and operable, when executed by the processor, to cause the apparatus to:
identify a plurality of sets of symbols for a transmission in a symbol period, each of the plurality of sets of symbols associated with a different stream;
map the plurality of sets of symbols to respective subsets of a plurality of time intervals, wherein a first set of symbols of the plurality of sets of symbols is mapped to the respective subset of the plurality of time intervals with at least one base value;
perform respective time to frequency domain transforms on the plurality of mapped sets of symbols over respective time to frequency domain transform sizes to obtain a plurality of frequency domain signals;
apply respective frequency domain phase ramps to the plurality of frequency domain signals;
map the plurality of phase ramped frequency domain signals to respective subsets of a set of subcarriers;
generate a time domain waveform for the transmission based on a frequency to time domain transform of the mapped plurality of phase ramped frequency domain signals to the set of subcarriers; and
transmit the time domain waveform to a receiver.

24. The apparatus of claim 23, wherein the instructions are executable by the processor to:
determine the respective subsets of the plurality of time intervals based at least in part on the respective time to frequency domain transform size.

25. The apparatus of claim 23, wherein the instructions are executable by the processor to:
determine the respective subsets of the plurality of time intervals based at least in part on frequency domain upsampling factors of the respective subsets of the set of subcarriers.

26. The apparatus of claim 23, wherein the instructions are executable by the processor to:
determine the respective subsets of the plurality of time intervals based at least in part on a transform size of the frequency to time domain transform.

27. The apparatus of claim 23, wherein the instructions are executable by the processor to:
determine the respective subsets of the plurality of time intervals based at least in part on the respective frequency domain phase ramps.

28. The apparatus of claim 23, wherein the plurality of sets of symbols are orthogonal to each other within the time domain waveform.

29. The apparatus of claim 23, wherein the respective subsets of the plurality of time intervals are orthogonal with respect to each other.

30. The apparatus of claim 23, wherein the respective subsets of the set of subcarriers are orthogonal with respect to each other.

31. The apparatus of claim 23, wherein the at least one base value is a null symbol or zero.

32. A non-transitory computer readable medium storing code for wireless communication, the code comprising instructions executable by a processor to:
identify a plurality of sets of symbols for a transmission in a symbol period, each of the plurality of sets of symbols associated with a different stream;
map the plurality of sets of symbols to respective subsets of a plurality of time intervals, wherein a first set of symbols of the plurality of sets of symbols is mapped to the respective subset of the plurality of time intervals with at least one base value;
perform respective time to frequency domain transforms on the plurality of mapped sets of symbols over respective time to frequency domain transform sizes to obtain a plurality of frequency domain signals;
apply respective frequency domain phase ramps to the plurality of frequency domain signals;
map the plurality of phase ramped frequency domain signals to respective subsets of a set of subcarriers;

generate a time domain waveform for the transmission based on a frequency to time domain transform of the mapped plurality of phase ramped frequency domain signals to the set of subcarriers; and transmit the time domain waveform to a receiver.

\* \* \* \* \*